(12) United States Patent
Goldwitz

(10) Patent No.: US 12,319,242 B2
(45) Date of Patent: Jun. 3, 2025

(54) TRUCK STORAGE AND SECURING APPARATUS

(71) Applicant: Brian Goldwitz, Waterbury, CT (US)

(72) Inventor: Brian Goldwitz, Waterbury, CT (US)

(*) Notice: Subject to any disclaimer, the term of this patent is extended or adjusted under 35 U.S.C. 154(b) by 0 days.

(21) Appl. No.: 18/801,701

(22) Filed: Aug. 12, 2024

(65) Prior Publication Data
US 2025/0145088 A1 May 8, 2025

Related U.S. Application Data

(60) Provisional application No. 63/547,567, filed on Nov. 7, 2023.

(51) Int. Cl.
*B60R 9/06* (2006.01)
*B65D 88/52* (2006.01)

(52) U.S. Cl.
CPC ............. *B60R 9/065* (2013.01); *B65D 88/52* (2013.01)

(58) Field of Classification Search
CPC ................................. B60R 9/065; B65D 88/52
USPC ............................................. 224/556; 220/6
See application file for complete search history.

(56) References Cited

U.S. PATENT DOCUMENTS

| | | | | |
|---|---|---|---|---|
| 2,635,796 A * | 4/1953 | Davolt | | B60R 9/00 224/42.31 |
| 4,108,342 A * | 8/1978 | Riva | | B60P 7/0807 224/571 |
| 4,253,594 A * | 3/1981 | Parks | | B60R 9/048 410/97 |
| 4,828,312 A * | 5/1989 | Kinkel | | B60R 11/06 224/404 |
| 5,163,889 A * | 11/1992 | Kaaua | | A63B 21/1654 482/904 |
| 5,230,449 A * | 7/1993 | Collins | | B60R 9/06 224/493 |
| 5,641,106 A * | 6/1997 | Slaughter | | B60R 9/08 224/916 |
| 5,641,254 A * | 6/1997 | Sullivan | | B60N 2/90 24/130 |
| 5,853,116 A * | 12/1998 | Schreiner | | B60R 9/00 224/404 |
| 5,956,979 A * | 9/1999 | Collins | | E05B 73/0005 70/58 |
| 6,273,654 B1 * | 8/2001 | Whitaker | | B60P 7/0807 410/97 |
| 6,367,673 B1 * | 4/2002 | Smith | | B60R 9/00 224/403 |
| 6,655,887 B2 * | 12/2003 | McDonald | | B60P 7/0823 410/97 |
| 6,935,526 B1 * | 8/2005 | Laggar | | E05G 1/024 220/7 |
| 7,131,620 B2 * | 11/2006 | Murphy | | B60N 3/023 248/500 |
| D586,123 S * | 2/2009 | Lowrey | | D3/273 |
| 7,857,177 B2 * | 12/2010 | Reeves | | B60R 9/10 224/403 |

(Continued)

*Primary Examiner* — Justin M Larson
(74) *Attorney, Agent, or Firm* — Furr Law Firm; Jeffrey M. Furr

(57) ABSTRACT

The current invention is a storage device for the back of a pickup truck. The storage device generally includes a bottom panel, a back panel, a first side panel, a second side panel and a top panel. Further, the back panel is movably coupled to the top panel. The device can have a securing mechanism to secure the storage device to the trunk 13 Claims, 25 Drawing Sheets

(56) References Cited

U.S. PATENT DOCUMENTS

| | | | | |
|---|---|---|---|---|
| 9,132,785 | B2 * | 9/2015 | Roach | B60R 9/065 |
| 9,132,786 | B2 * | 9/2015 | Roach | B60R 9/065 |
| 9,387,812 | B2 * | 7/2016 | Bexar | B60R 5/041 |
| 9,463,751 | B1 * | 10/2016 | Grubenhoff | B60R 13/01 |
| 9,517,879 | B2 * | 12/2016 | Chawla | B65D 88/526 |
| D785,439 | S * | 5/2017 | Baus | D8/333 |
| D812,449 | S * | 3/2018 | Baus | D8/333 |
| 10,399,505 | B1 * | 9/2019 | Brackman | B60R 9/065 |
| 10,625,687 | B1 * | 4/2020 | Todd | B60R 9/065 |
| 10,821,912 | B1 * | 11/2020 | Onuschak | B60R 11/06 |
| 10,889,247 | B2 * | 1/2021 | Goldwitz | B60R 9/06 |
| 10,889,250 | B2 * | 1/2021 | Flajnik | B62D 33/0207 |
| 11,358,534 | B2 * | 6/2022 | Gardner | B60R 9/065 |
| 11,840,385 | B2 * | 12/2023 | Layton | B65D 7/26 |
| 2011/0219826 | A1 * | 9/2011 | Jeli | E05B 71/00 70/15 |
| 2024/0326699 | A1 * | 10/2024 | Goldwitz | B60R 7/02 |

* cited by examiner

TRUCK STORAGE AND SECURING APPARATUS

PRIORITY

This application claims the priority of provisional application 63/547,567 filed Nov. 7, 2024.

TECHNICAL FIELD

The technology discussed below relates generally to automotive features, and more specifically to truck storage containers and securing.

BACKGROUND

Pick-up trucks are one of the most popular and versatile vehicles in use today. Pick-up trucks typically have an enclosed cab and an open cargo bed behind the cab. The open cargo bed allows all types of things to be quickly and easily loaded, carried and unloaded. Since the first truck was made for use by non-commercial applications, there has been a need for a confined storage space. Over the years many variations of storage boxes have been devised. A simple box with a lid attached to the inside of the cargo bed was the beginning, followed by a "tool box" mounted to extend over the sides of the cargo bed from the driver's side to the passenger side. The "tool box" was attached similar to the original design.

All these storage boxes are very useful but they do present the owner a problem while not in use. For example, such storage boxes typically consume 25 to 30 percent of the truck's cargo bed space. As these boxes are often attached in a manner that is not conducive to easy removal, this loss of space has prevented many from purchasing one of these storage boxes.

Aspects of the present disclosure provide storage boxes that can be readily folded out of the way to facilitate use of the cargo bed space when the storage box is not in use.

DETAILED DESCRIPTION

The illustrations presented herein are, in some instances, not actual views of any particular storage device or truck, but are merely representations employed to describe the present disclosure. Additionally, elements common between figures may retain the same numerical designation.

Figure 1:
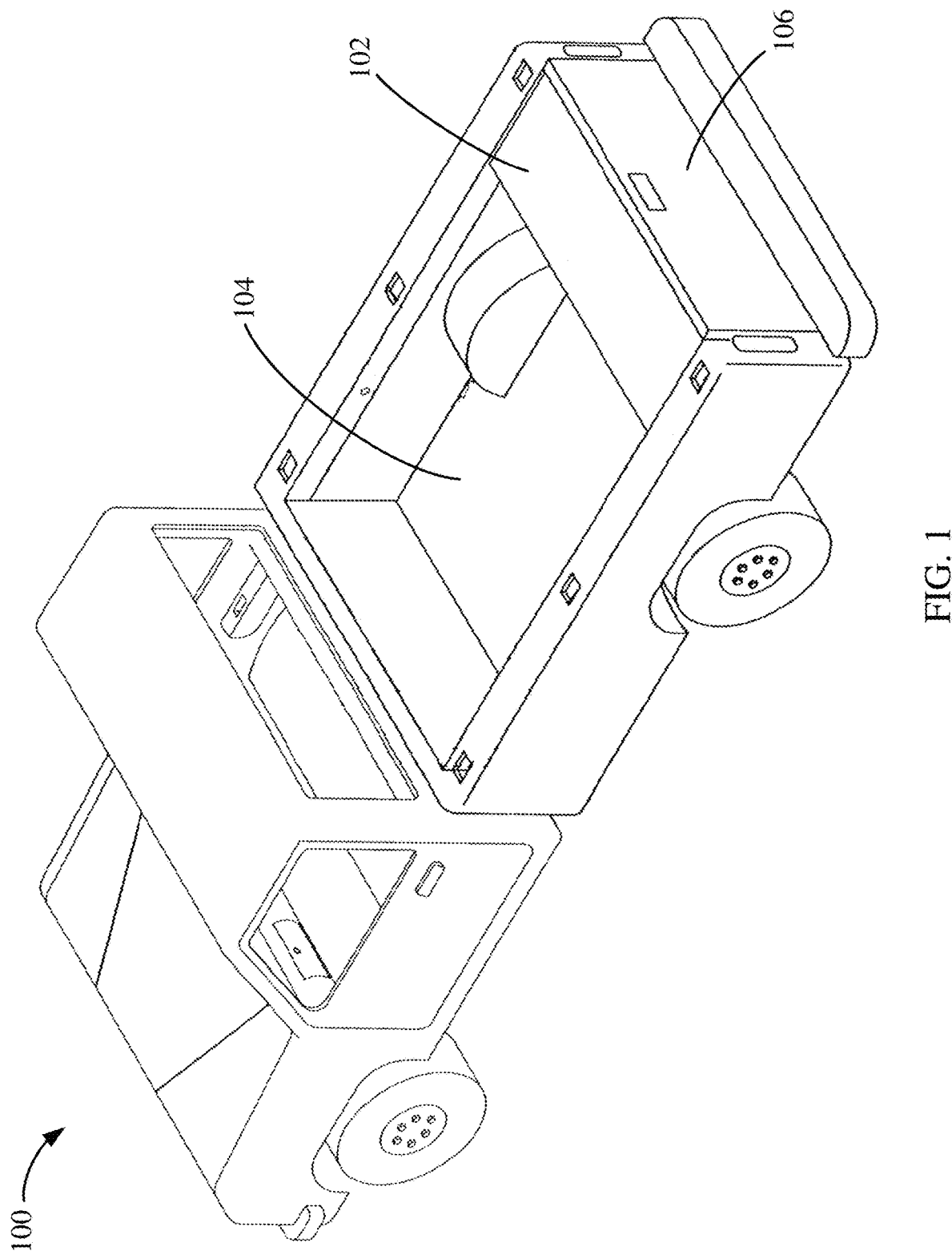
FIG. 1 is a view of a truck with a storage device in a storage configuration according to an embodiment of the present disclosure.

Aspects of the present disclosure relate to foldable storage devices for trucks or other similarly configured vehicles. FIG. 1 is a view of a truck 100 with a storage device 102 positioned on a cargo bed 104 adjacent to a tailgate 106 according to an embodiment of the present disclosure. In this illustration, the storage device 102 is open and ready for use to store items therein. As used herein, this configuration with the storage device 102 open and ready for use to store items therein is referred to as the storage configuration. According to aspects of the present disclosure, the storage device 102 may be configured to fold out of the way when not in use. When the storage device 102 is folded out of the way, this configuration may be referred to herein as the folded configuration.

Figure 2:
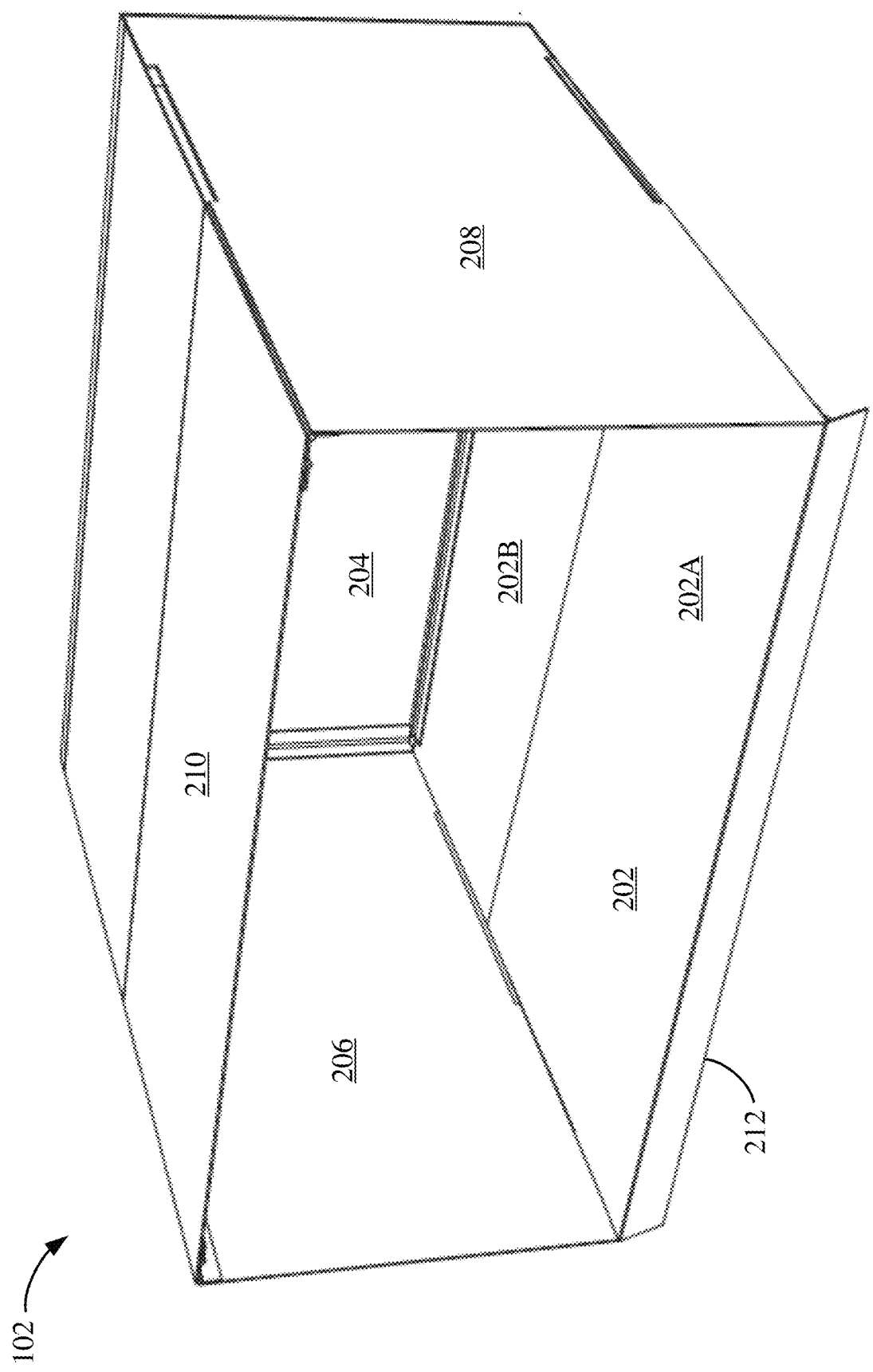
FIG. 2 is an isometric view of a storage device according to one embodiment of the present disclosure.

FIG. 2 illustrates an isometric view of a storage device 102 in the storage configuration according to at least one embodiment. As shown, the storage device 102 generally includes a bottom panel 202, a back panel 204, a first side panel 206, a second side panel 208 and a top panel 210. Further, the back panel 204 is movably coupled to the top panel 210.

The bottom panel 202 may be generally a rectangular shape with four edges. Along a first edge, the bottom panel 202 can be movably coupled to the back panel 204 by a hinge connecting the two panels along an adjoining edge. In at least one embodiment, the bottom panel 202 may also be movably coupled to the first side panel 206 and the second side panel 208. In some embodiments, the bottom panel 202 may include two sections, a first bottom panel section 202A movably coupled to a second bottom panel section 202B.

According to an aspect of the present disclosure, a second edge of the bottom panel 202 opposite from the first edge is coupled to an attachment mechanism 212. The attachment mechanism 212 can be movably coupled to the bottom panel 202. According to one or more embodiments, the attachment mechanism 212 is configured to be positioned between the cargo bed 104 of the truck 100 and the tailgate 106 to retain the storage device 102 in the cargo bed 104. As shown in FIG. 2, the attachment mechanism 212 may be configured as one or more panels. In another example, shown in FIG. 3, the attachment mechanism 212 may be configured as one or more rods 302 coupled with a flexible material 304, which flexible material 304 may be coupled to the bottom panel 202.

Figure 3:
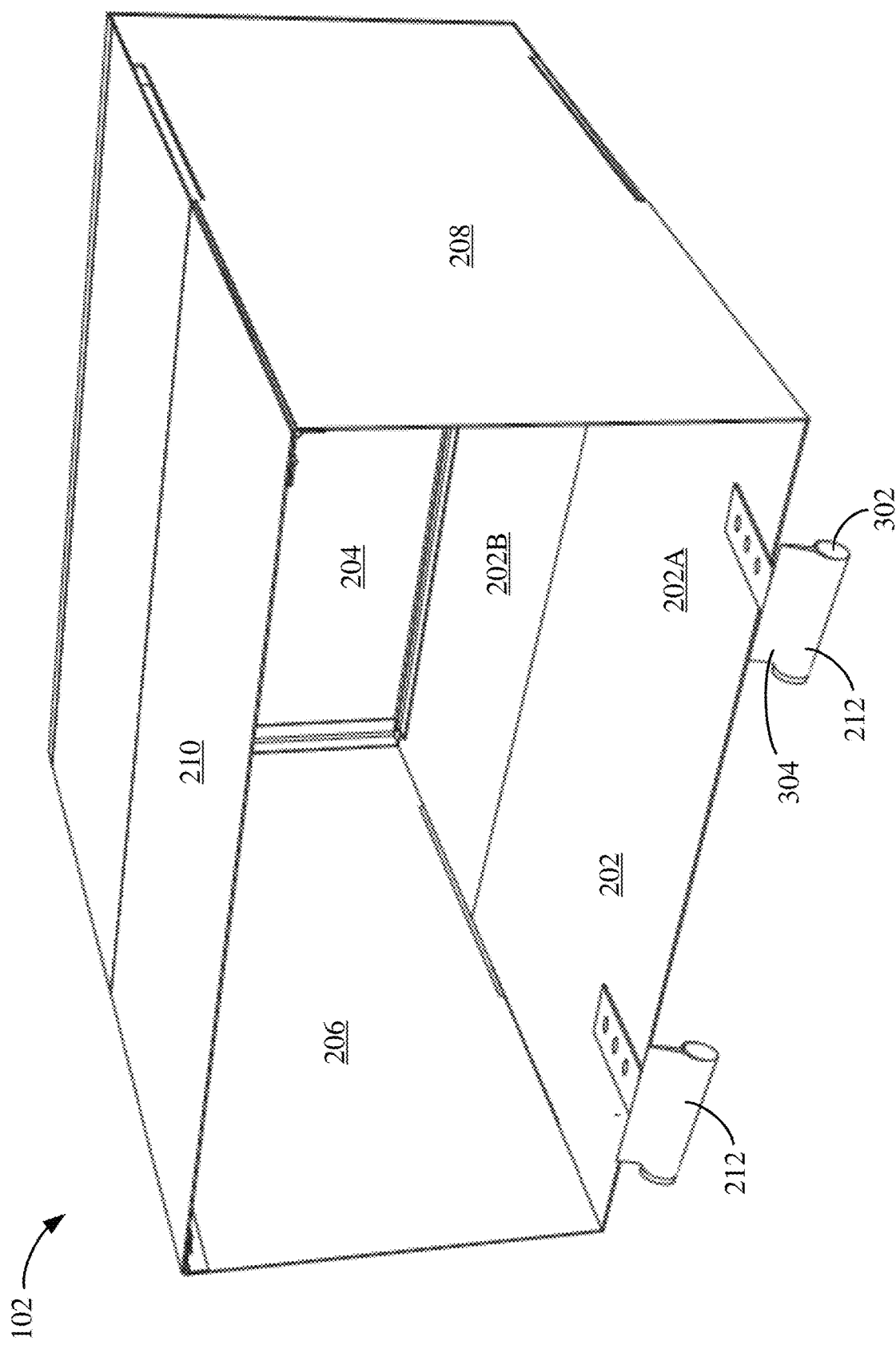
FIG. 3 is an isometric view of a storage device according to one embodiment of the present disclosure.
Figure 4:
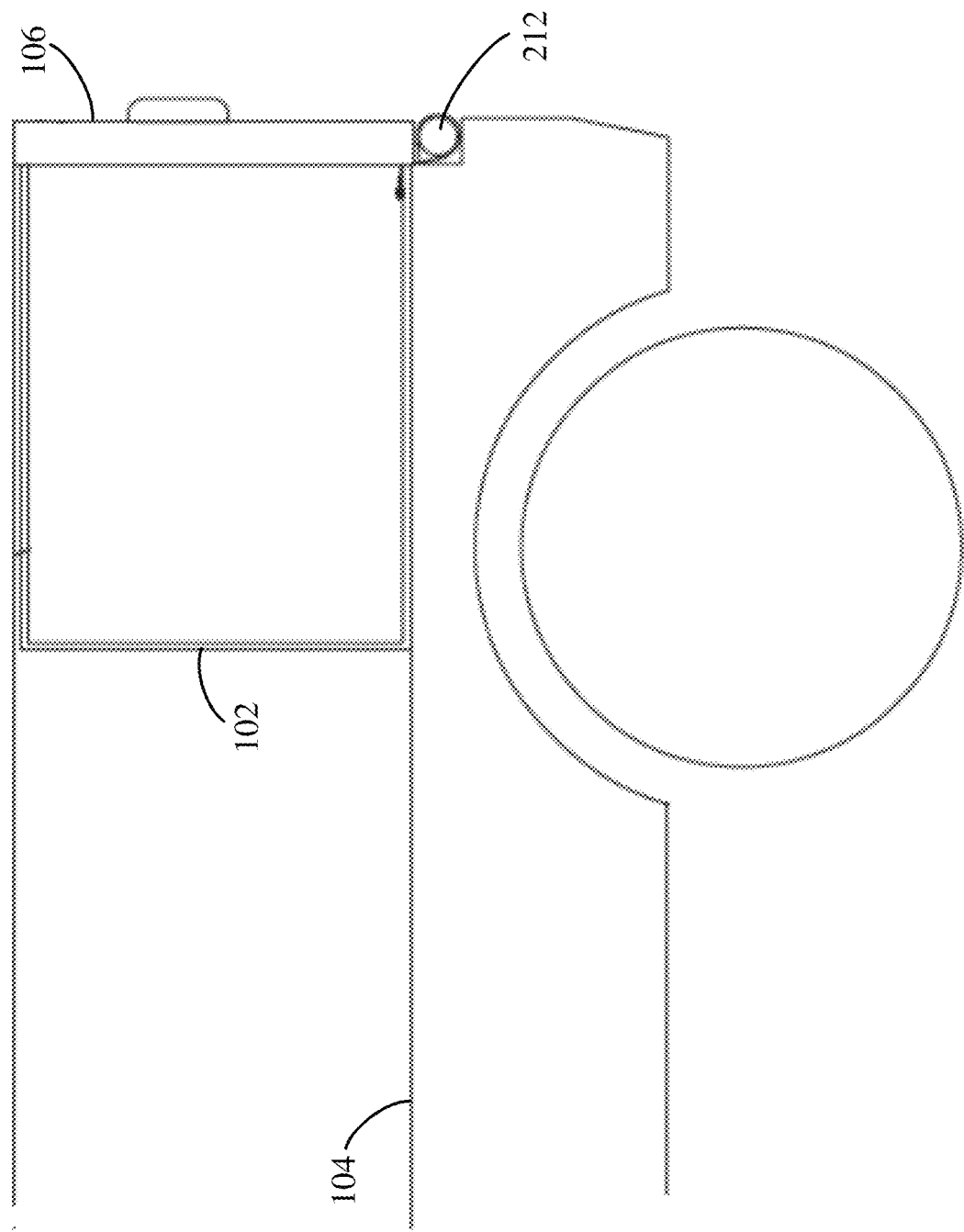
FIG. 4 is a side view of a truck with a storage device coupled to the truck by means of an attachment mechanism according to at least one example.

As shown in FIG. 4, the attachment mechanism 212 is positioned between the tailgate 106 and the cargo bed 104. When the tailgate 106 is open, the attachment mechanism 212 can be positioned between the tailgate 106 and the cargo bed 104. With the tailgate 106 closed, as shown, the attachment mechanism 212 retains the storage device 102 in position. In the example in FIG. 4, the attachment mechanism 212 embodied as shown in FIG. 3 is depicted, but it should be apparent that other embodiments of attachment mechanism 212 may operate in a similar manner. In still other embodiments, the attachment mechanism 212 can facilitate bolting, adhering, or otherwise coupling the storage device 102 to the truck 100, such as to the cargo bed 104.

Figure 5:
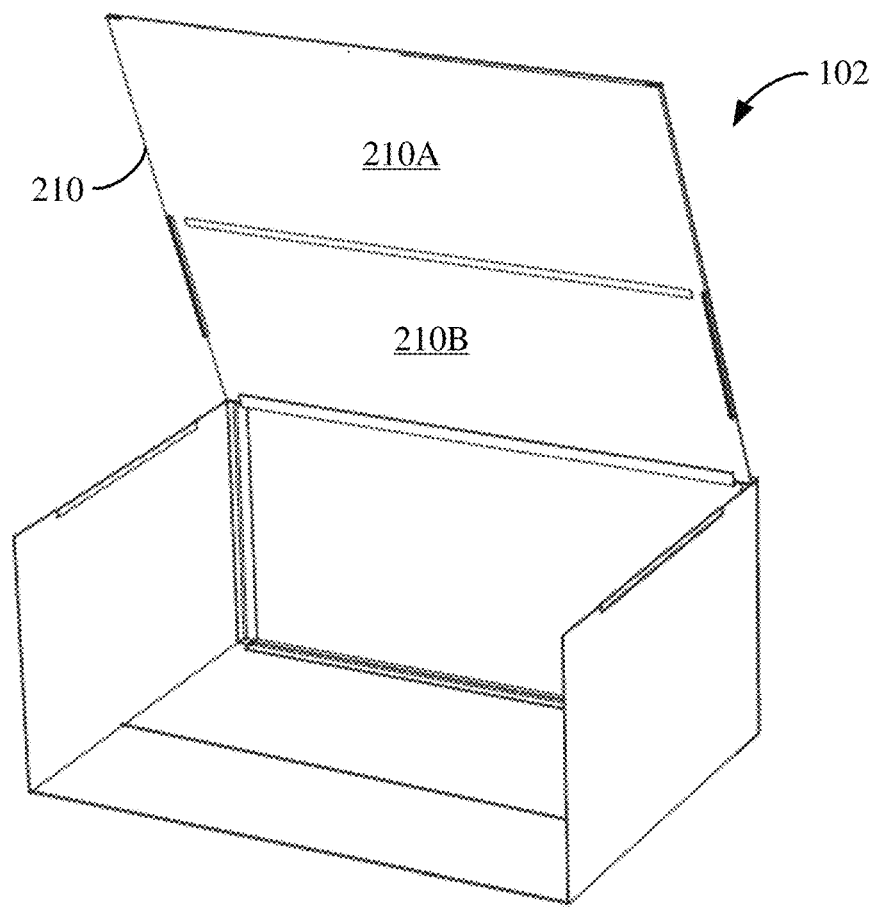
FIG. 5 is an isometric view of a storage device depicting an intermediate stage of converting from a storage configuration to a folded configuration according to at least one embodiment.
Figure 6:
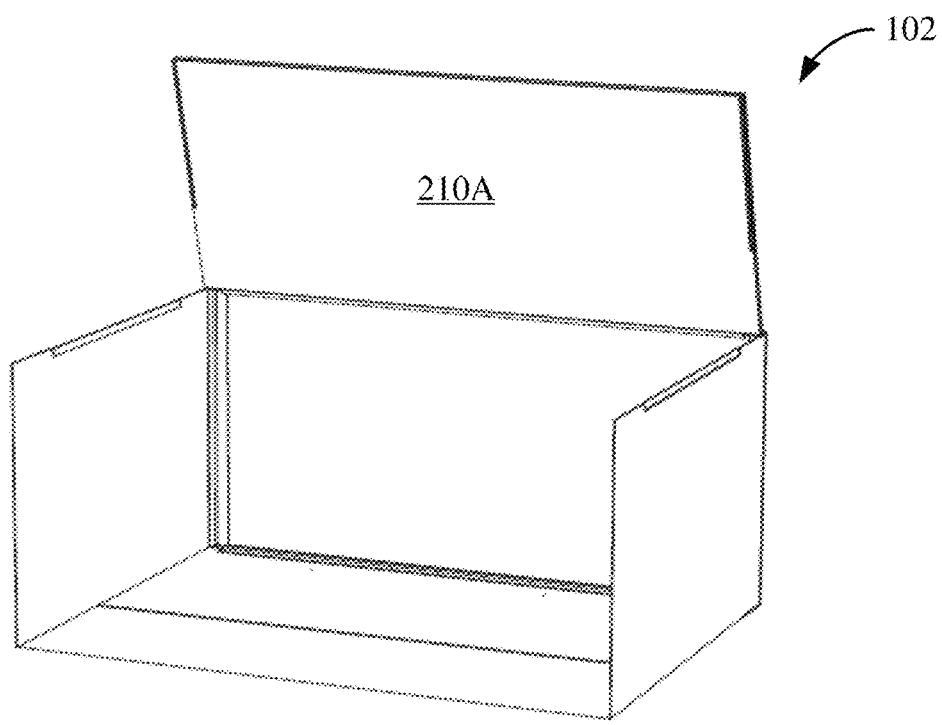
FIG. 6 is an isometric view of a storage device depicting an intermediate stage of converting from a storage configuration to a folded configuration according to at least one embodiment.
Figure 7:
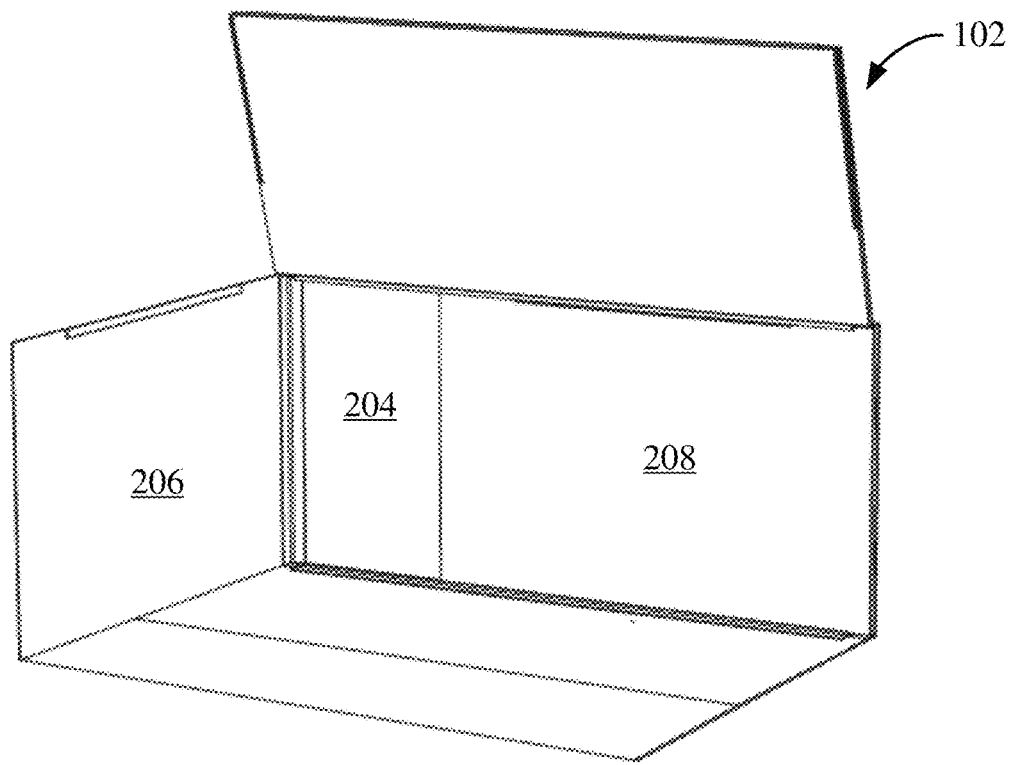
FIG. 7 is an isometric view of a storage device depicting an intermediate stage of converting from a storage configuration to a folded configuration according to at least one embodiment.
Figure 8:
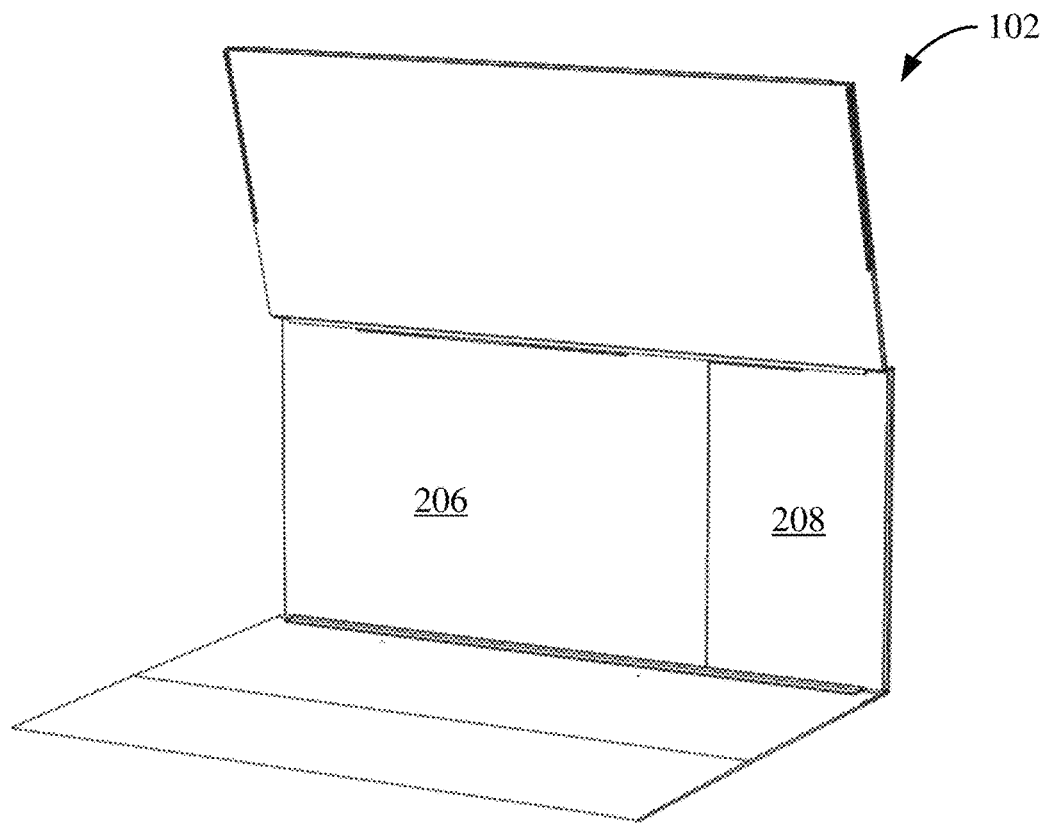
FIG. 8 is an isometric view of a storage device depicting an intermediate stage of converting from a storage configuration to a folded configuration according to at least one embodiment.
Figure 9:
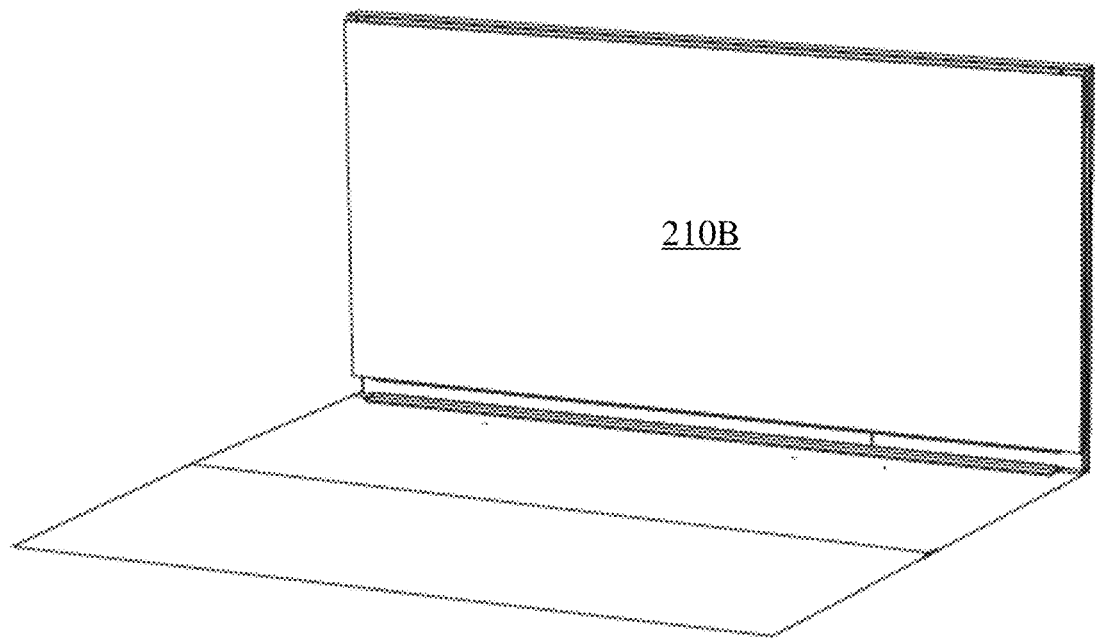
FIG. 9 is an isometric view of a storage device depicting an intermediate stage of converting from a storage configuration to a folded configuration according to at least one embodiment.
Figure 10:
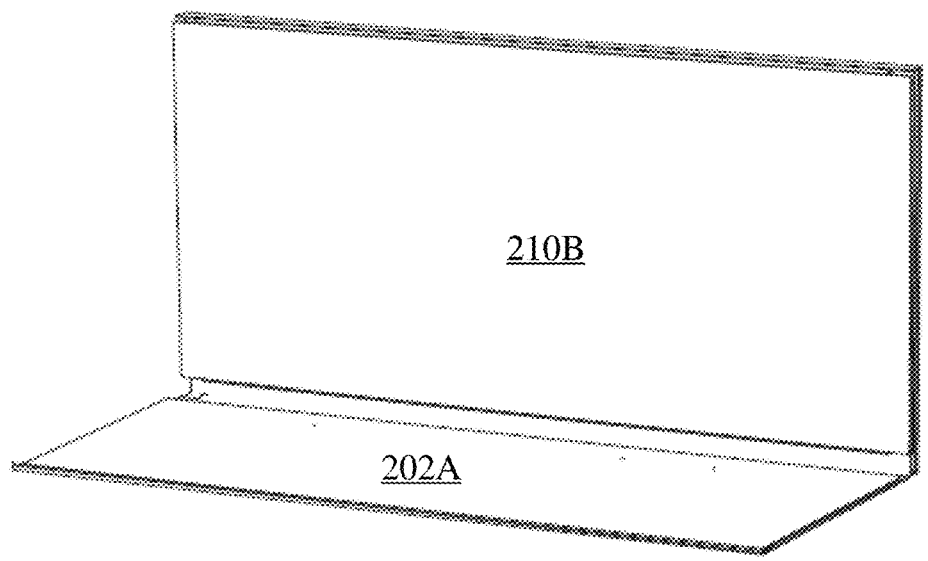
FIG. 10 is an isometric view of a storage device depicting an intermediate stage of converting from a storage configuration to a folded configuration according to at least one embodiment.
Figure 11:
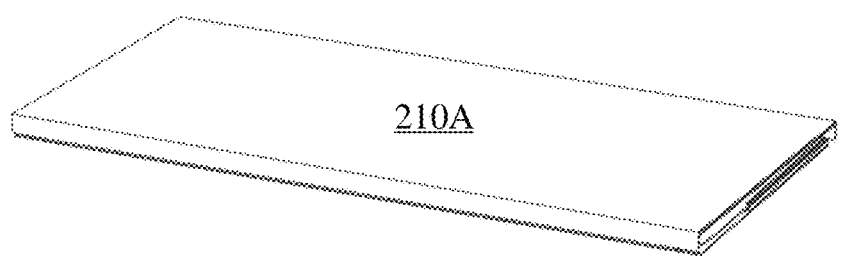
FIG. 11 is an isometric view of a storage device in a folded configuration according to at least one embodiment.

According to an aspect of the present disclosure, the various panels are sized and shaped in a manner so that the panels can be folded together into the folded configuration. FIGS. 5 through 11 illustrate an example of converting a storage device 102 from the storage configuration to the folded configuration according to at least one embodiment. As shown in FIG. 5, the top panel 210, including first and second sections 210A and 210B is lifted up, and the first section 210A is folded onto the second section 210B, as shown in FIG. 6. As shown in FIGS. 7 and 8, the first side panel 206 and second side panel 208 can be folded toward the back panel 204. As shown in FIG. 9, the top panel 210 can be folded down toward the back panel 204. In this example, the top panel 210 can sandwich the first side panel 206 and the second side panel 208 between the top panel 210 and the back panel 204. The first bottom panel section 202A can be folded onto the second bottom panel section 202B, shown in FIG. 10. Further, the top panel 210 can be folded down onto the bottom panel 202, as shown in FIG. 11.

Figure 12:
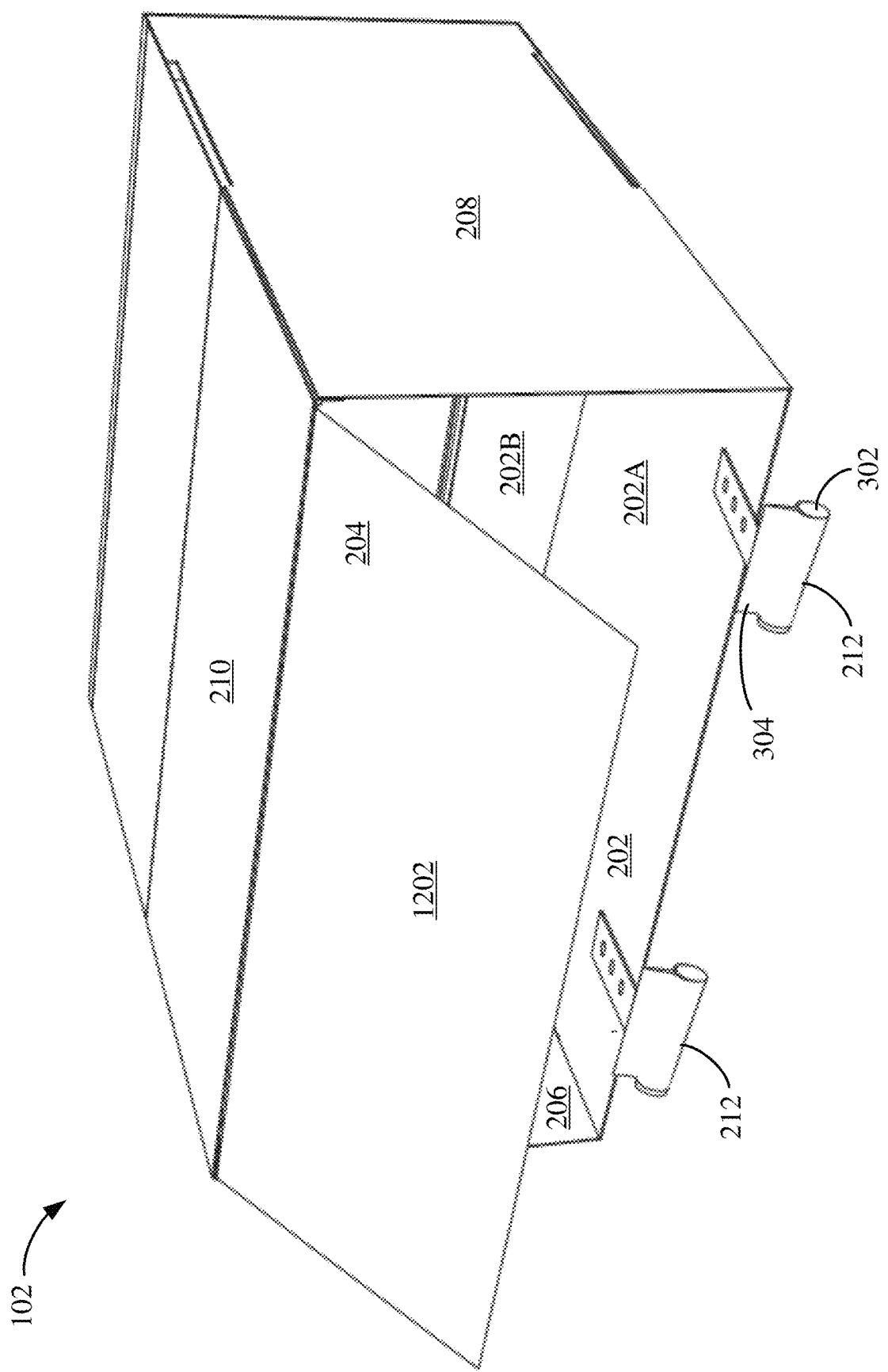
FIG. 12 is an isometric view of a storage device according to one embodiment of the present disclosure.
Figure 13:
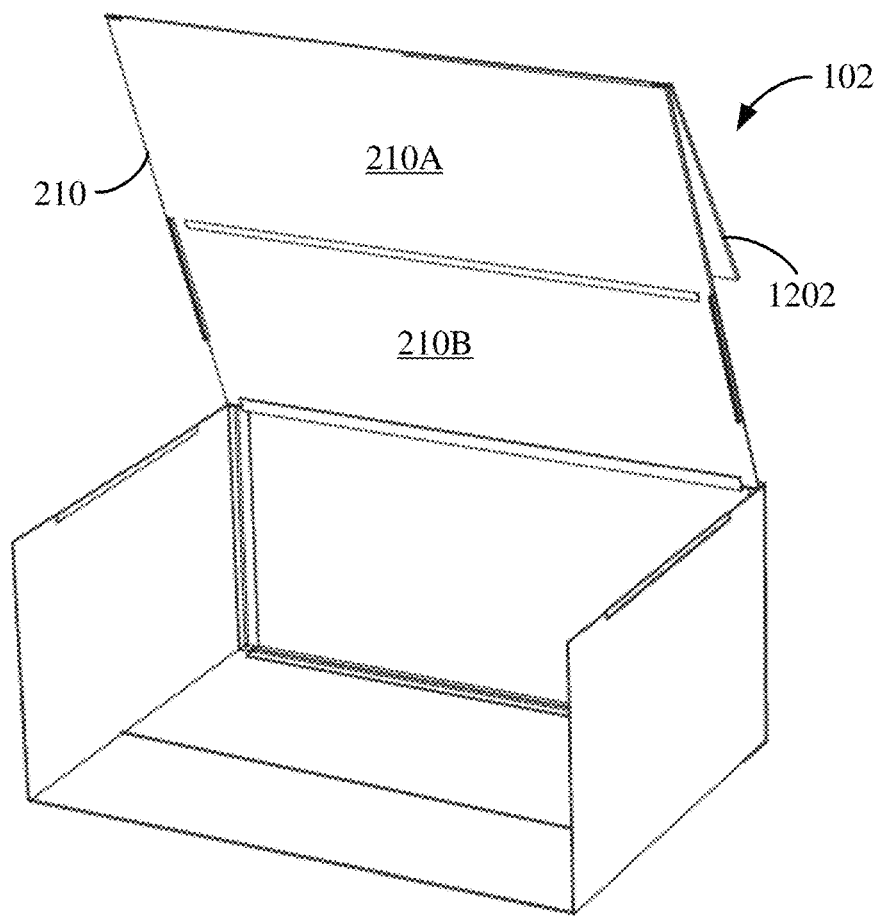
FIG. 13 is an isometric view of a storage device depicting an intermediate stage of converting from a storage configuration to a folded configuration according to at least one embodiment.
Figure 14:
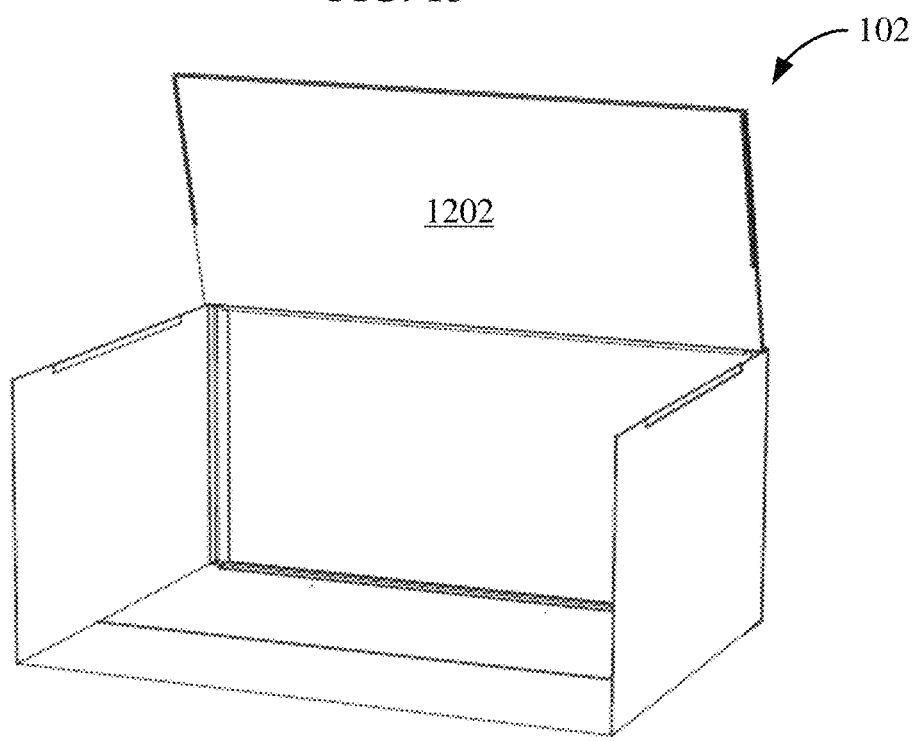
FIG. 14 is an isometric view of a storage device depicting an intermediate stage of converting from a storage configuration to a folded configuration according to at least one embodiment.

FIG. 12 illustrates another example of the storage device 102. In this example, a front panel 1202 is included. The front panel 1202 is movably coupled to the top panel 210. With a front panel 202, the storage device 102 can facilitate keeping the inside of the storage device 102 free of water. In this example, the front panel 1202 can also be folded when converting the storage device 102 from the storage configuration to the folded configuration. As shown, in FIG. 13, the front panel 1202 can be folded onto the top panel 210, and the two top panel sections can be folded together as shown in FIG. 14. From the configuration depicted in FIG. 14, the storage device 102 can be folded in a manner similar to that shown in FIGS. 7 through 11.

Figure 15:
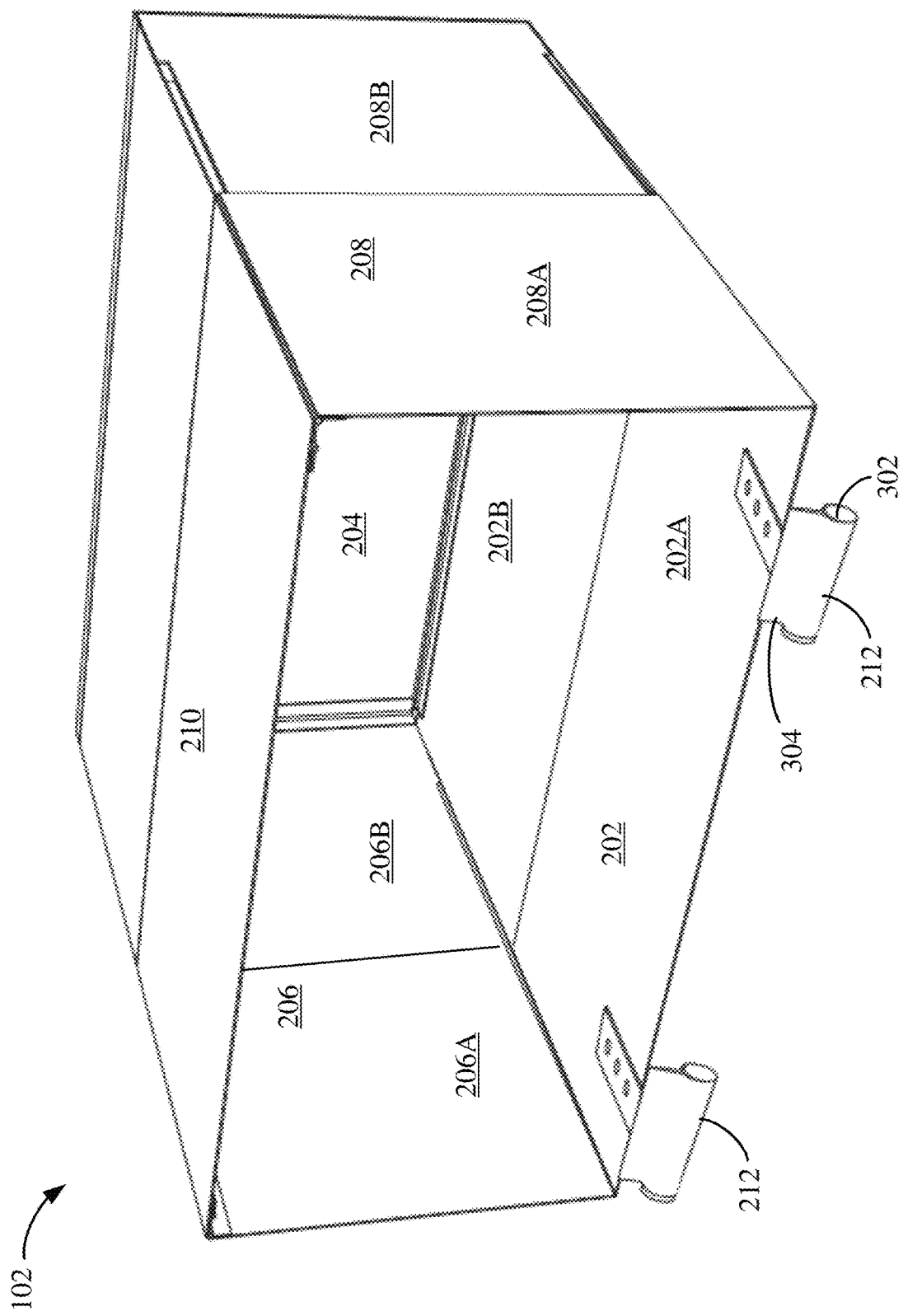
FIG. 15 is an isometric view of a storage device according to one embodiment of the present disclosure.
Figure 16:
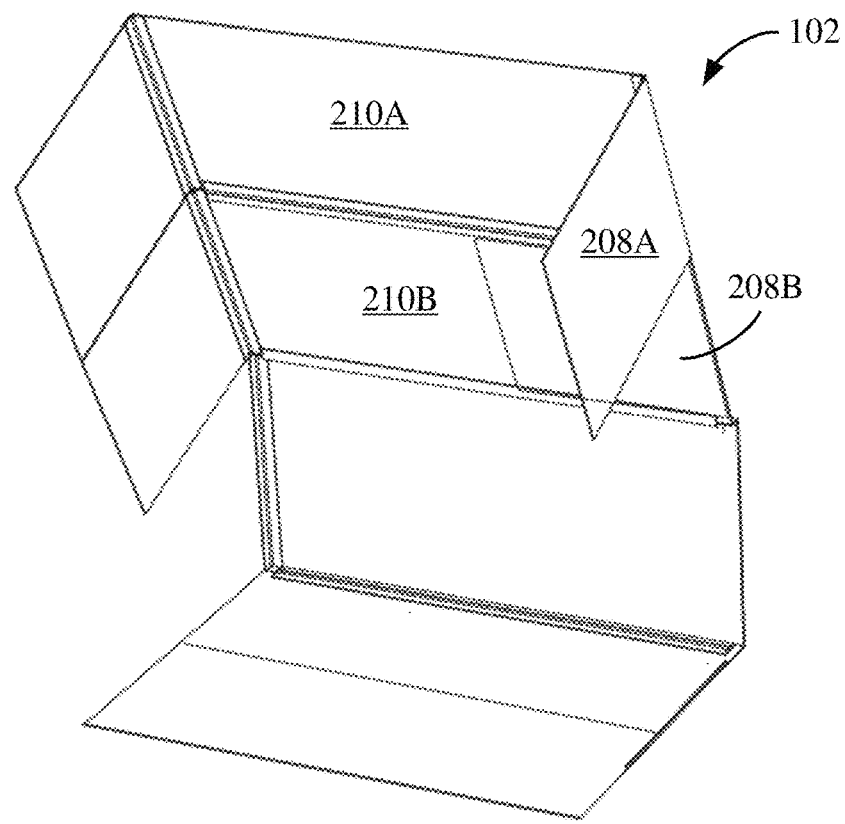
FIG. 16 is an isometric view of a storage device depicting an intermediate stage of converting from a storage configuration to a folded configuration according to at least one embodiment.
Figure 17:
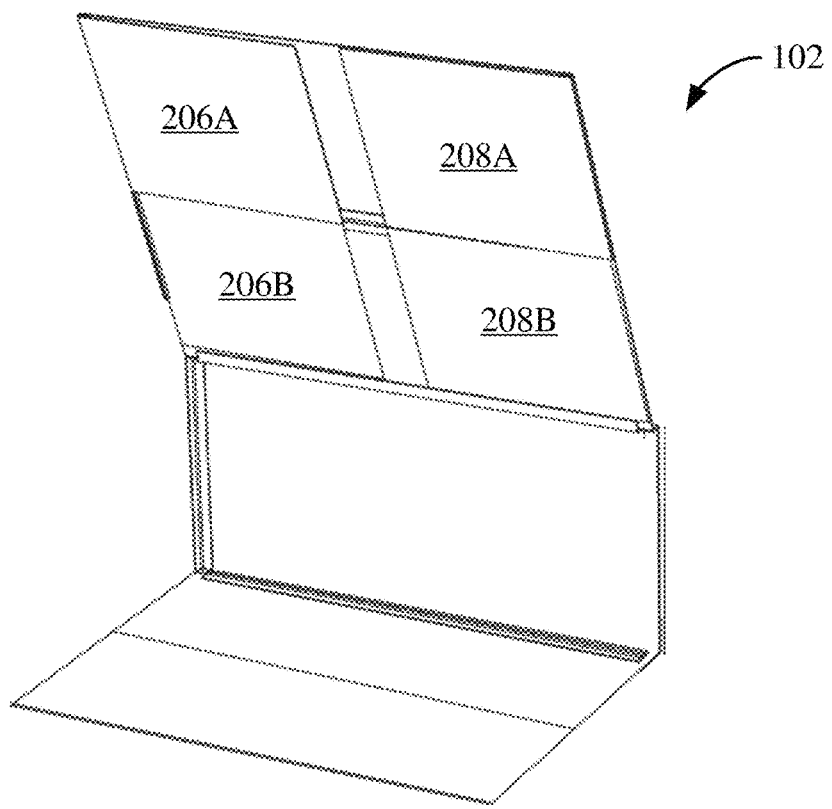
FIG. 17 is an isometric view of a storage device depicting an intermediate stage of converting from a storage configuration to a folded configuration according to at least one embodiment.
Figure 18:
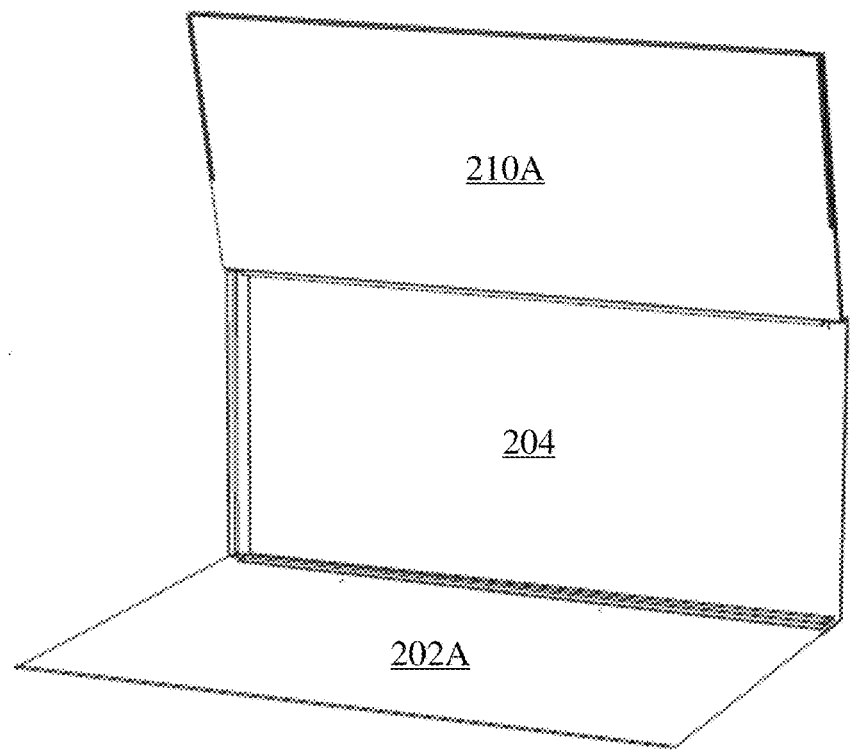
FIG. 18 is an isometric view of a storage device depicting an intermediate stage of converting from a storage configuration to a folded configuration according to at least one embodiment.
Figure 19:
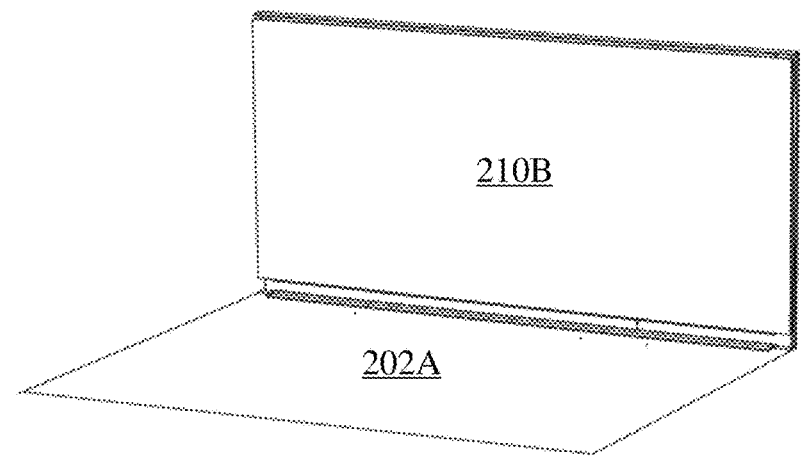
FIG. 19 is an isometric view of a storage device depicting an intermediate stage of converting from a storage configuration to a folded configuration according to at least one embodiment.
Figure 20:
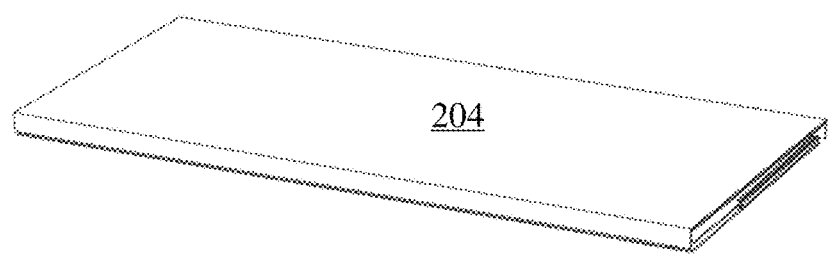
FIG. 20 is an isometric view of a storage device in a folded configuration according to at least one embodiment.

FIG. 15 illustrates yet another example of a storage device 102. In this example, the first side panel 206 and the second side panel 208 each include multiple side panel sections 206A, 206B and 208A, 208B movably coupled to respective top panel sections. One example of folding this embodiment of the storage device 102 is shown in FIGS. 16-20. As shown in FIGS. 16 and 17, the respective side panel sections can be folded onto the top panel 210. In FIG. 18, the first top panel section 210A can be folded onto the second top panel section 210B, sandwiching the side panel sections 206A, 206B and 208A, 208B therebetween. The top panel 210 can then be folded down onto the back panel 204 and the first bottom panel section 202A can be folded onto the second bottom panel section 202B, as shown in FIG. 19. Further, the back panel 204 can be folded onto the bottom panel 202, as shown in FIG. 20.

Figure 21:
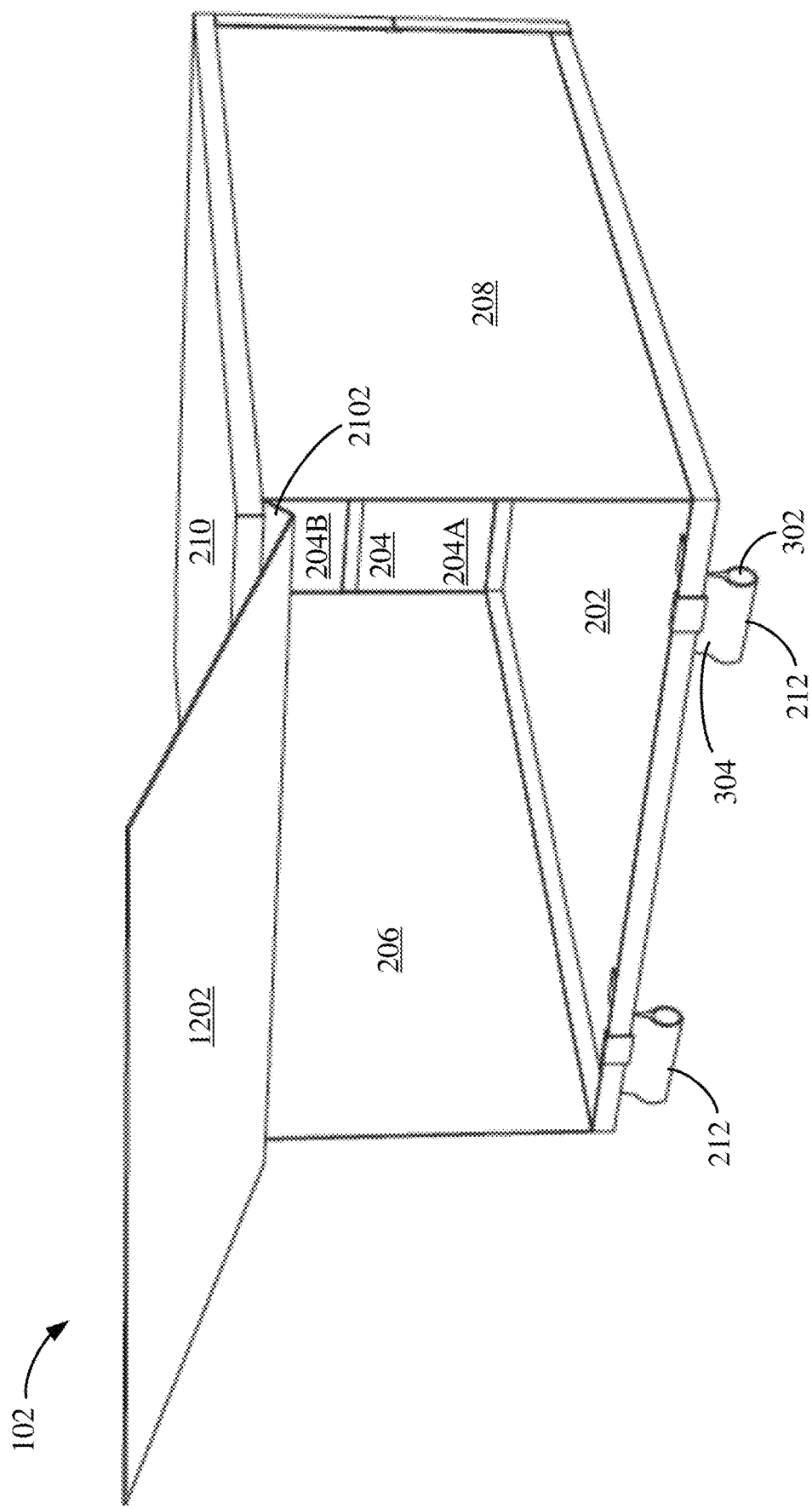
FIG. 21 is an isometric view of a storage device according to one embodiment of the present disclosure.

FIG. 21 illustrates another example of a storage device 102. In this example, the back panel 204 includes a first back panel section 204A moveably coupled with a second back panel section 204B. Additionally, the depicted example includes a front panel 1202 moveably coupled to the top panel 210. In this embodiment, the front panel 1202 includes a coupling section 2102 that extends transverse to the rest of the front panel 1202. This coupling section 2102 facilitates hinging the front panel 1202 upward onto the top panel 210, such when placing items in the storage device 102 and when folding the storage device 102 into the folded configuration.

Figure 22:
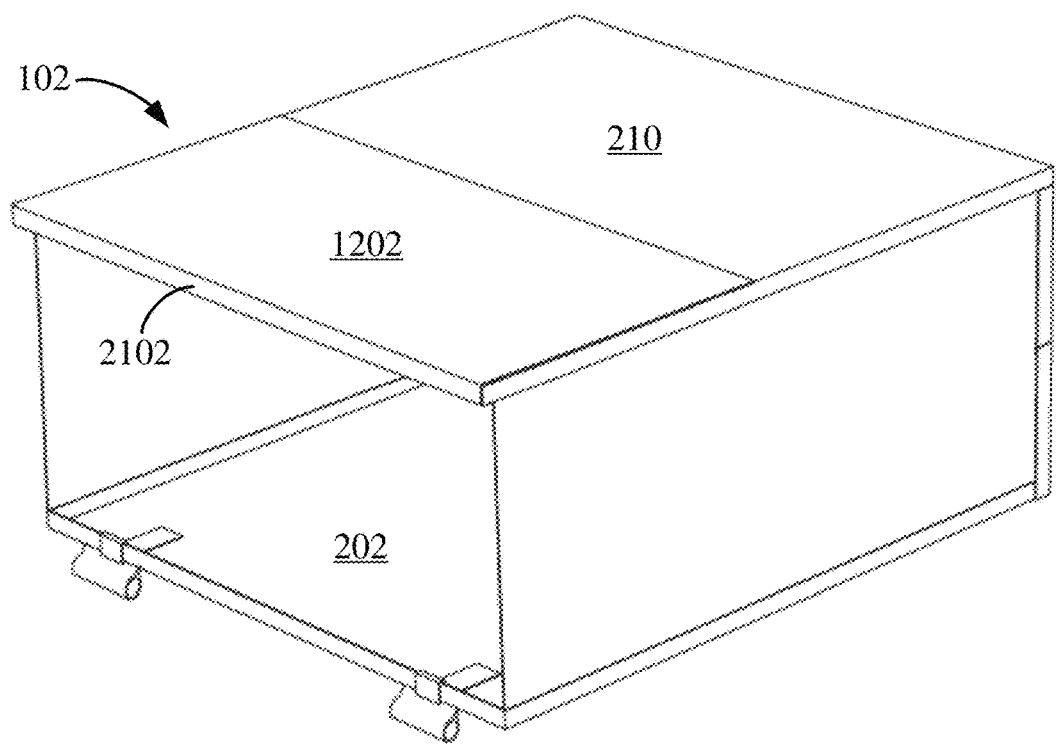
FIG. 22 is an isometric view of a storage device depicting an intermediate stage of converting from a storage configuration to a folded configuration according to at least one embodiment.
Figure 23:
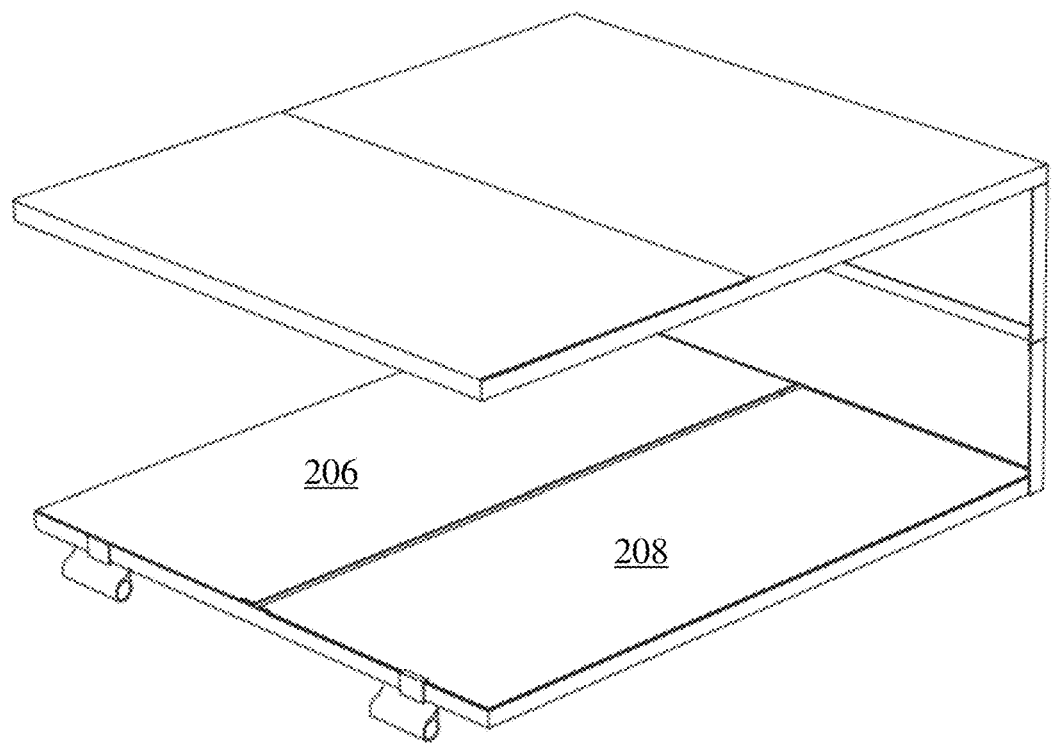
FIG. 23 is an isometric view of a storage device depicting an intermediate stage of converting from a storage configuration to a folded configuration according to at least one embodiment.
Figure 24:
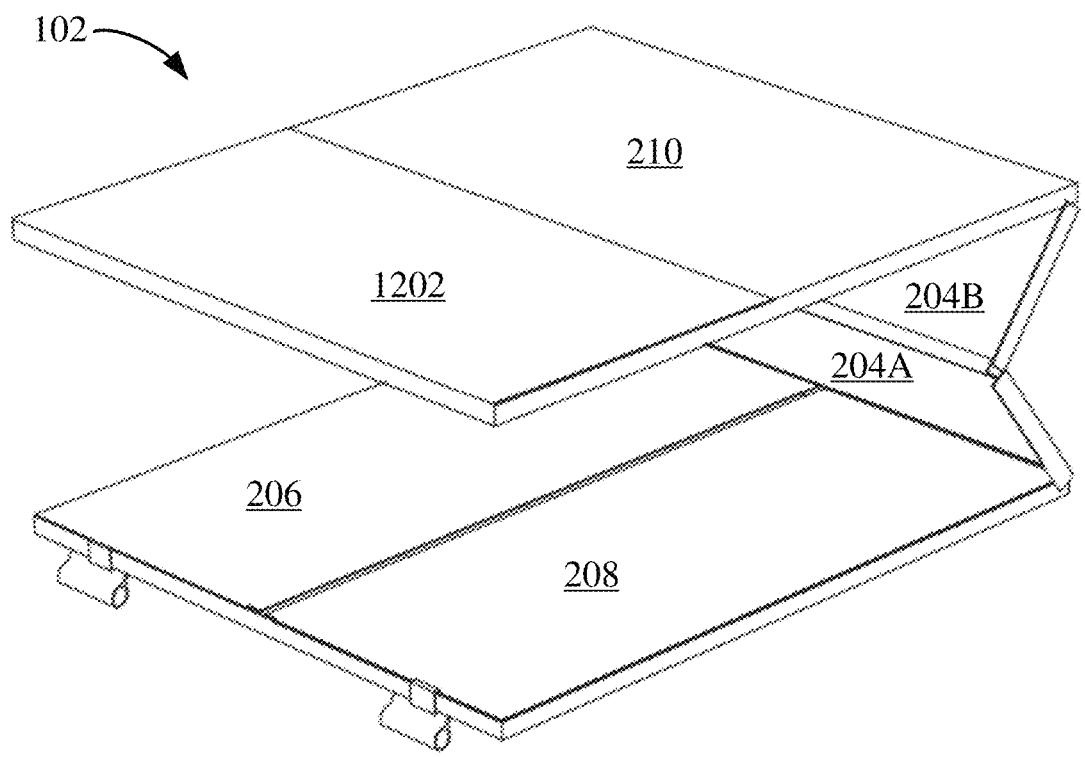
FIG. 24 is an isometric view of a storage device depicting an intermediate stage of converting from a storage configuration to a folded configuration according to at least one embodiment.
Figure 25:
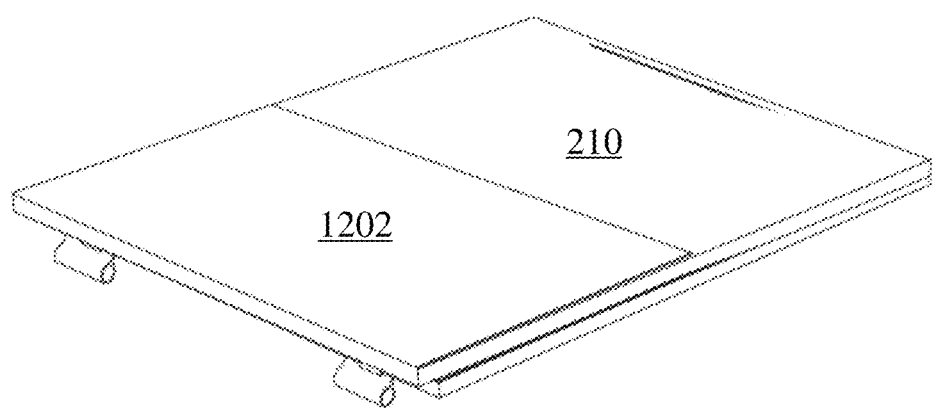
FIG. 25 is an isometric view of a storage device in a folded configuration according to at least one embodiment.

One example of folding the embodiment of FIG. 21 into the folded configuration is shown in FIGS. 22-25. As shown in FIG. 22, the front panel 1202 can be folded onto the top panel 210. As noted, the coupling section 2102 facilitates this fold. In FIG. 23, the first side panel 206 and the second side panel 208 can be folded down onto the bottom panel 202. In FIG. 24, the two sections of the back panel 204 (e.g., 204A and 204B) can be folded together as shown, resulting in the top panel 210 being lowered onto the bottom panel 202, with the two sections of the back panel 204 sandwiched between the top panel 210 and the bottom panel 202. The fully folded configuration is shown in FIG. 25.

Figure 26:
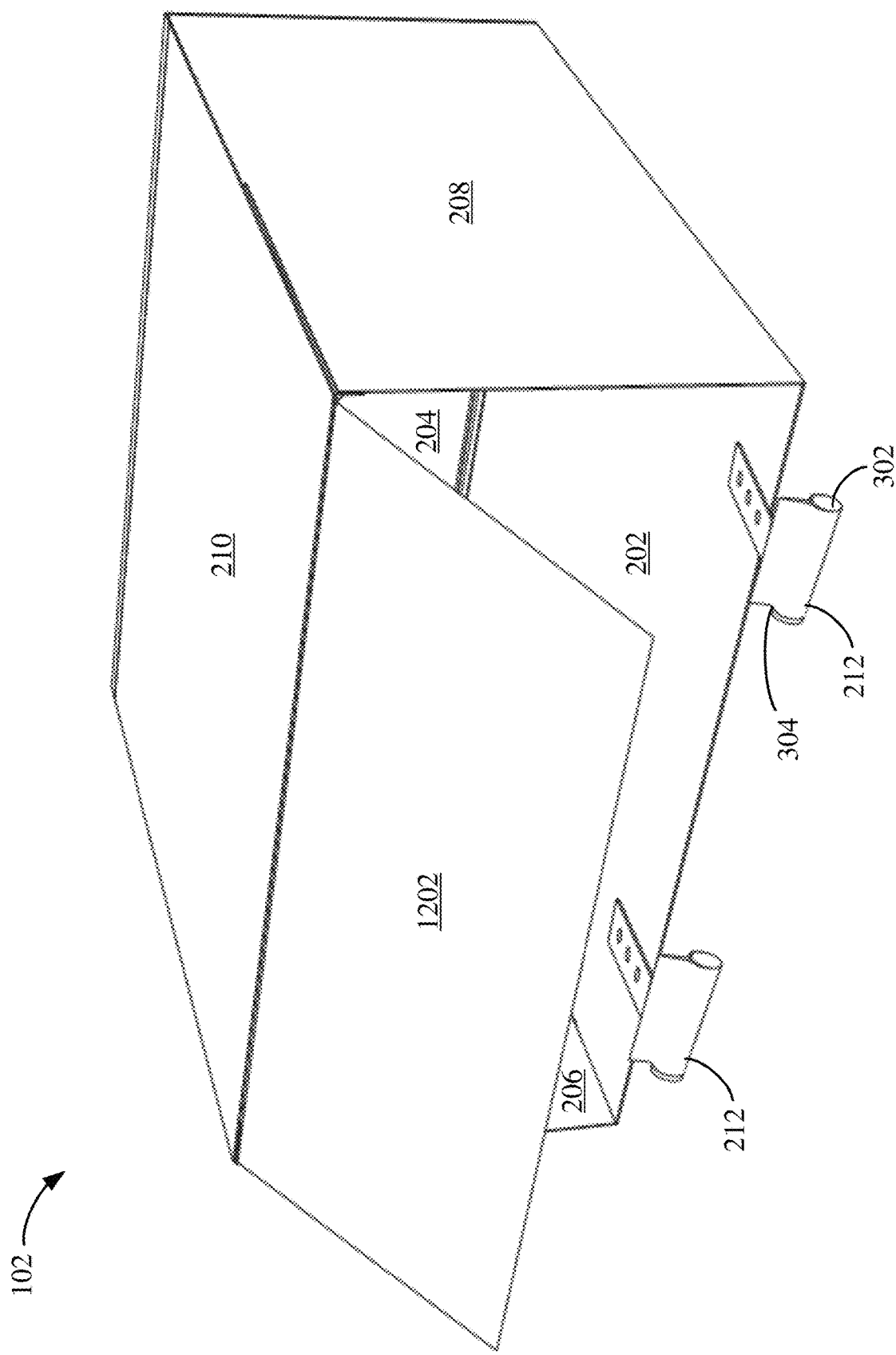
FIG. 26 is an isometric view of a storage device according to one embodiment of the present disclosure.

FIG. 26 is yet another example of a storage device 102. In this example, the back panel 204 again includes a first back panel section 204A moveably coupled with a second back panel section 204B. Additionally, the depicted example includes a front panel 1202 moveably coupled to the top panel 210. In one example, the first side panel 206 and the second side panel 208 can be movably coupled to the bottom panel 202, while in other embodiments they may be moveably coupled to the top panel 210.

Figure 29:
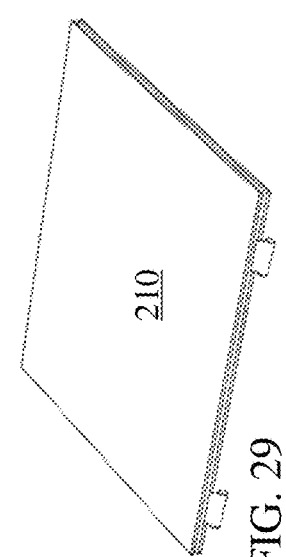
FIG. 29 is an isometric view of a storage device in a folded configuration according to at least one embodiment.
Figure 28:
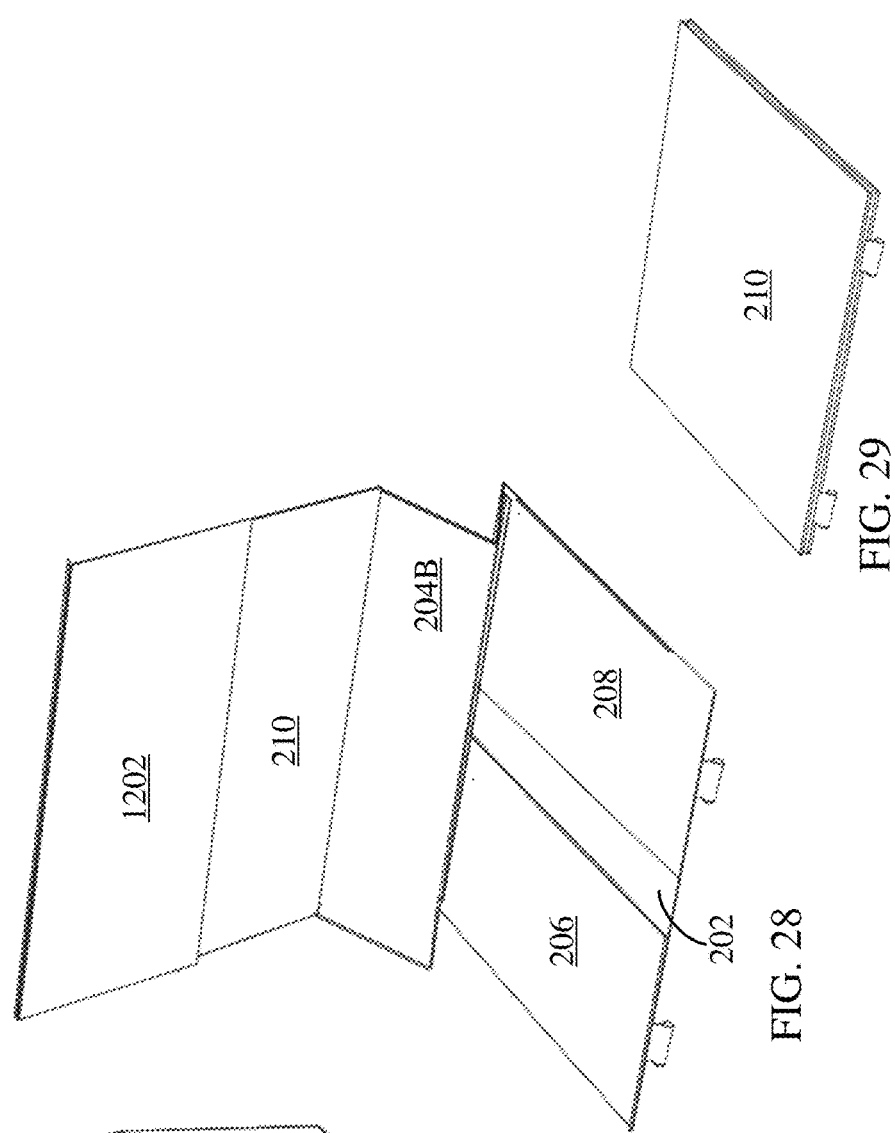
FIG. 28 is an isometric view of a storage device depicting an intermediate stage of converting from a storage configuration to a folded configuration according to at least one embodiment.
Figure 27:
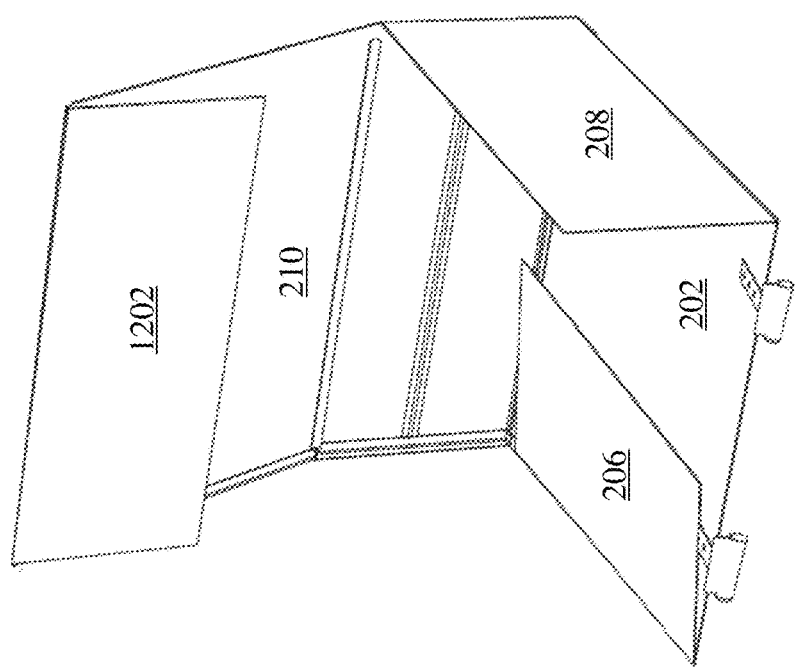
FIG. 27 is an isometric view of a storage device depicting an intermediate stage of converting from a storage configuration to a folded configuration according to at least one embodiment.

FIGS. 27-29 illustrate folding the storage device 102 of FIG. 26 into the folded configuration when the first side panel 206 and the second side panel 208 are movably coupled to the bottom panel 202. As shown in FIG. 27, the front panel 1202 can be folded onto the top panel 210, and the first and second side panels 206, 208 can be folded onto the bottom panel 202. As shown in FIGS. 28 and 29, the two sections of the back panel 204 (e.g., 204A and 204B) can be folded together as shown, resulting in the top panel 210 being lowered onto the bottom panel 202. The fully folded configuration is shown in FIG. 29.

Figure 32:
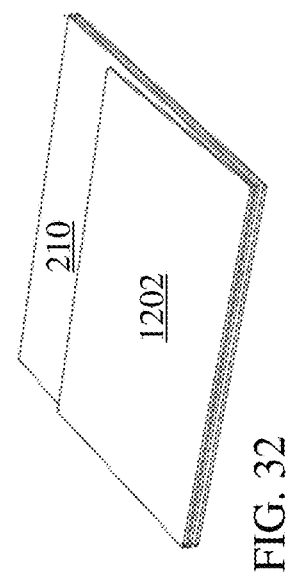
FIG. 32 is an isometric view of a storage device in a folded configuration according to at least one embodiment.
Figure 31:
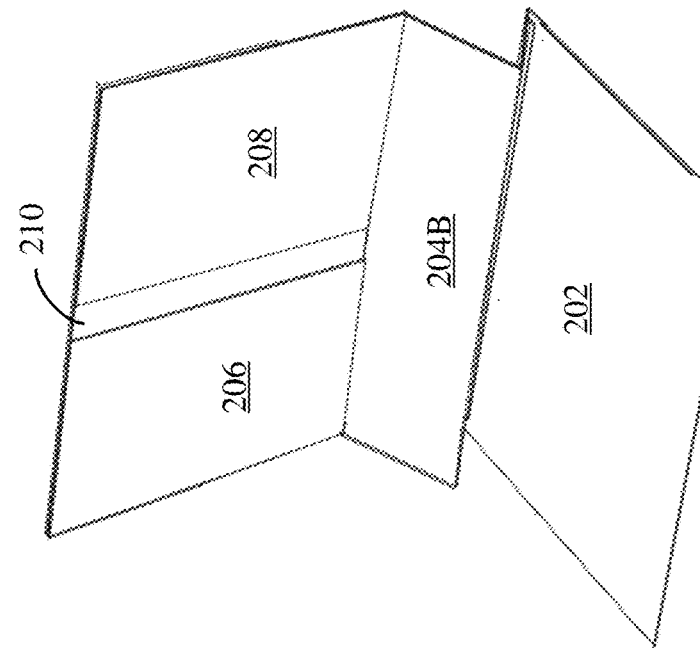
FIG. 31 is an isometric view of a storage device depicting an intermediate stage of converting from a storage configuration to a folded configuration according to at least one embodiment.
Figure 30:
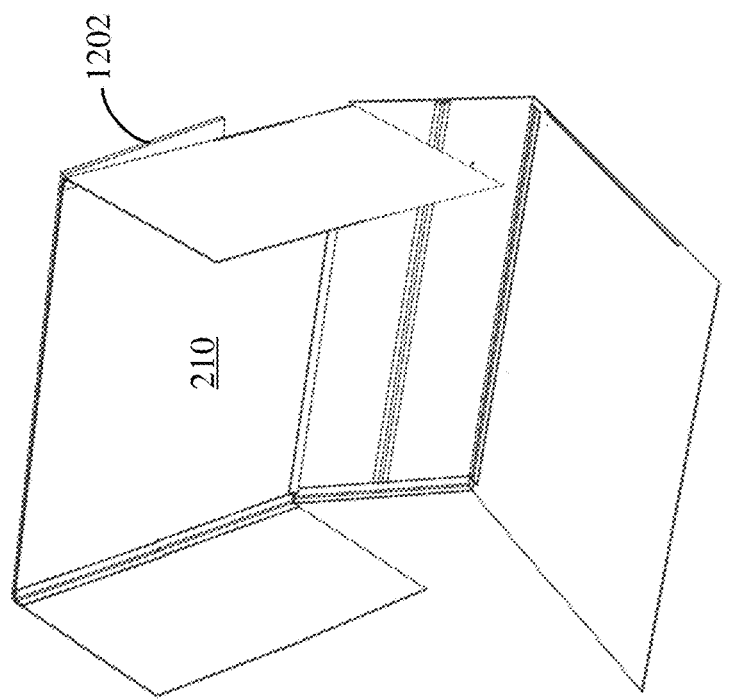
FIG. 30 is an isometric view of a storage device depicting an intermediate stage of converting from a storage configuration to a folded configuration according to at least one embodiment.

FIGS. 30-32 illustrate folding the storage device 102 of FIG. 26 into the folded configuration when the first side panel 206 and the second side panel 208 are movably coupled to the top panel 210. As shown in FIG. 30, the front panel 1202 can be folded onto the top panel 210. In FIG. 31, the first side panel 206 and the second side panel 208 can be folded onto the top panel 210 and the two sections of the back panel 204 (e.g., 204A and 204B) can be folded together as shown, resulting in the top panel 210 being lowered onto the bottom panel 202. The fully folded configuration is shown in FIG. 32.

Figure 33:
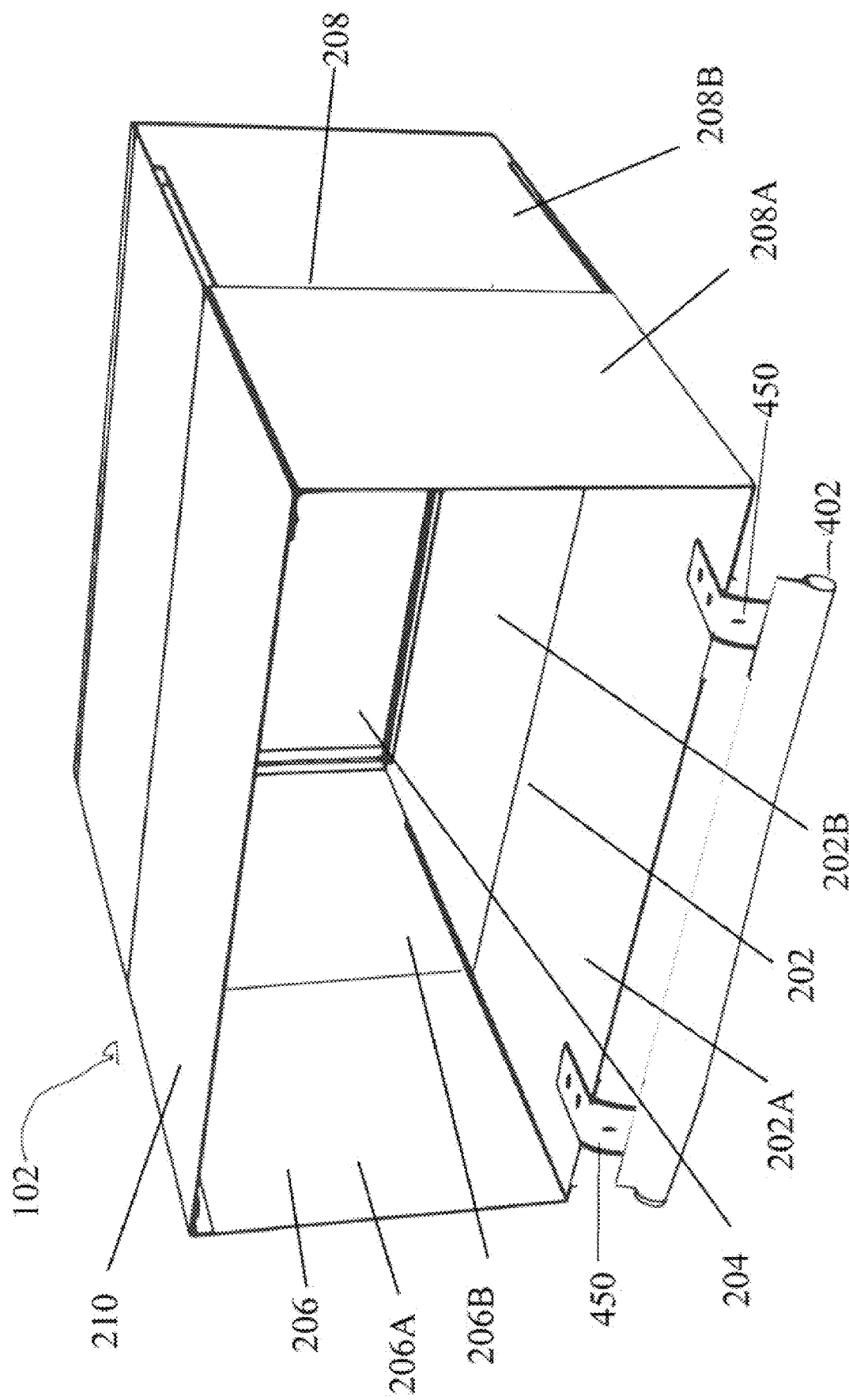
FIG. 33 is an isometric view of a storage device according to one embodiment of the present disclosure with one long single rod.

FIG. 33 is an isometric view of a storage device according to one embodiment of the present disclosure with one long single rod 402 used to secure the storage device 102 to the vehicle. The single rod 402 is attached to the storage device 102 by a plurality of securing bands 450. In the preferred embodiment, the securing tabs 450 are attached to the bottom panel 202 by a securing means which can be any strong securing means such as glue, adhesive, nuts and bolts are welding. The other end of the securing bands 450 is attached to the single rod 402 using a securing means. A plurality of rods can be used instead of a single rod.

The securing bands 450 would be made of a strong, flexible material such as plastic, leather, fabric, metal or rubber.

Figure 34:
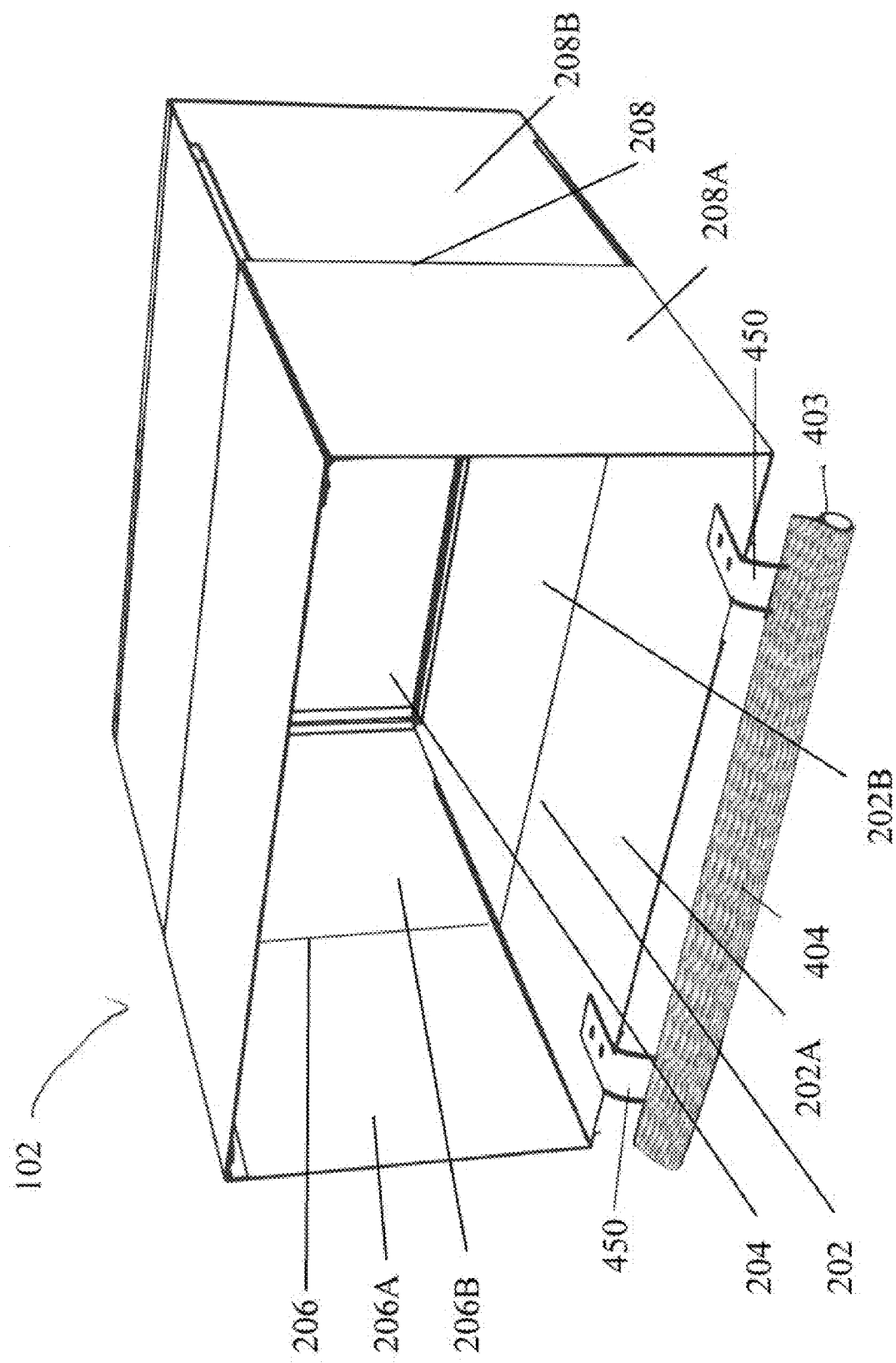
FIG. 34 is an isometric view of a storage device with one long mesh single rod.

FIG. 34 is an isometric view of a storage device 102 with showing a covering mesh 404 encircling the single rod 403. The covering mesh 404 would cover and hold the single rod 403. The securing bands 450 can connect to the long single rod 402 directly or it can attached to the covering mesh 404 with the covering mesh 404 holding the long single rod 402.

Figure 35:
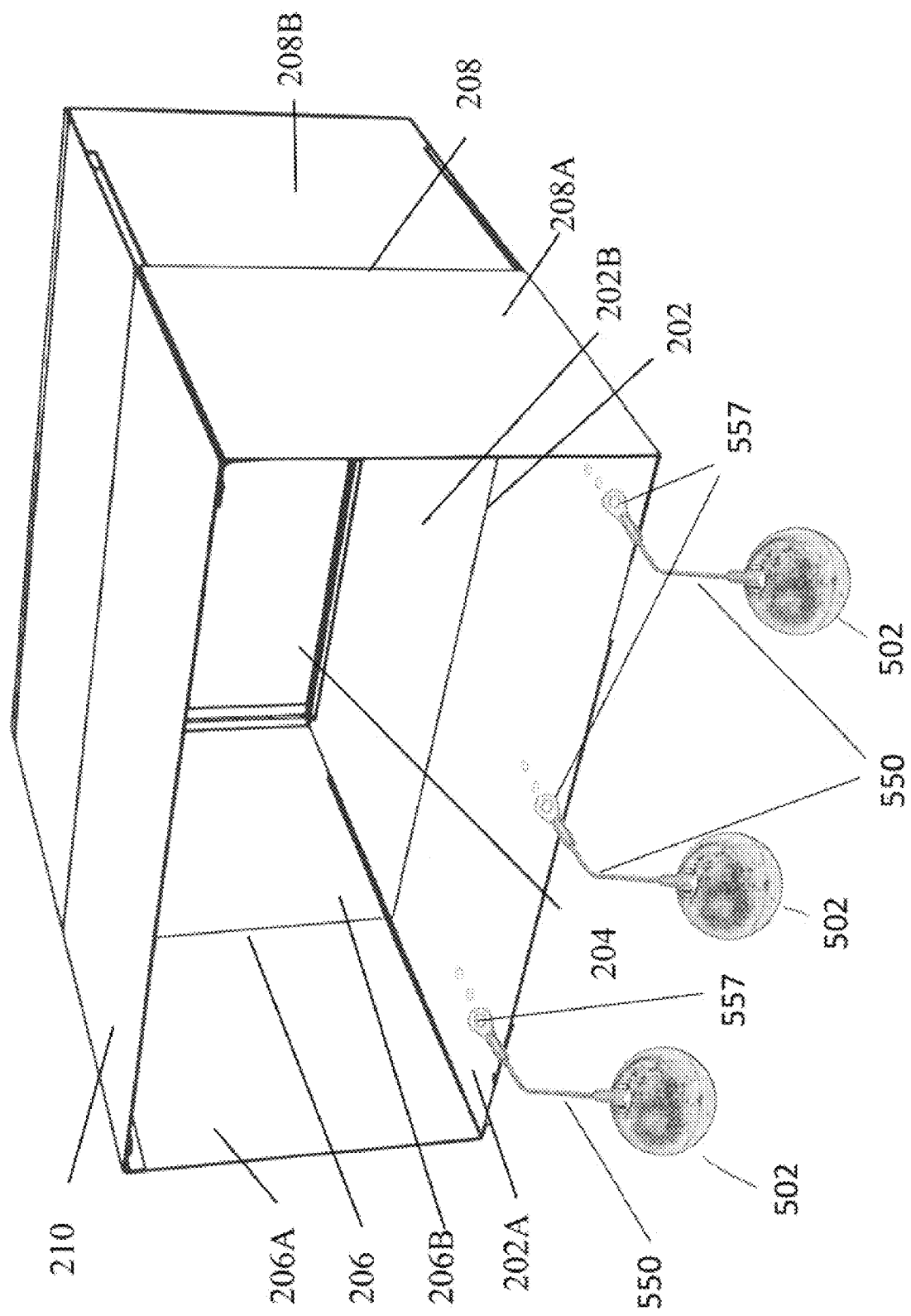
FIG. 35 shows a view of the storage device with hanging holding weights.

FIG. 35 shows a view of the storage device with a polarity hanging holding weights 502 that secures the storage device 102. The holding weights 502 are easier the store and install as they are attached to a cable with an eyelet 557 at the other end that attaches to the storage device 102. The holding weights 502 can be in any shape such on spheres or wheel shape. The holding weights 502 are attached to the attached to the storage device 102 by a plurality of securing cables 550. In the preferred embodiment, the securing cables 550 are attached to the holding weights 502 by an attachment means such as welding, cap or being molded and part of the holding weight 502. The securing cables are attached to are attached to the bottom panel 202 by a securing means by an eyelet 557 in the preferred embodiment or another which can be any strong securing means such as glue, adhesive, nuts and bolts or welding. The securing cable 550 has a length long enough to secure the storage device 102 or item being secured with the holding weights 550 hanging on beyond the tailgate 106 as shown in FIG. 37.

Figure 36:
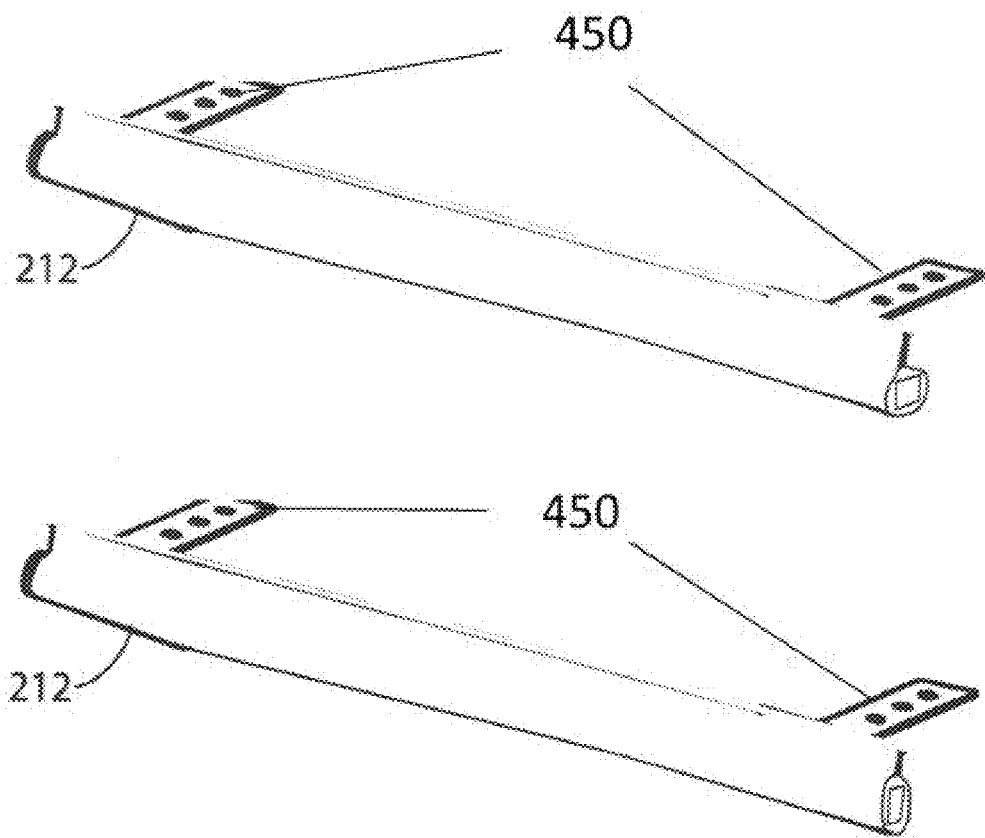
FIG. 36 shows two embodiments of the long single rod.

FIG. 36 shows two embodiments of the long single rod 212 which has an attachment bar that attaches the single rods 212 to the storage device 102 where the rods are rectangular in shape. The securing tabs 450 has holes for where bolts or screws can be used to attach it to the storage device 102. FIG. 12 shows a multi rod 212 embodiment with a single rod 302.

Figure 37:
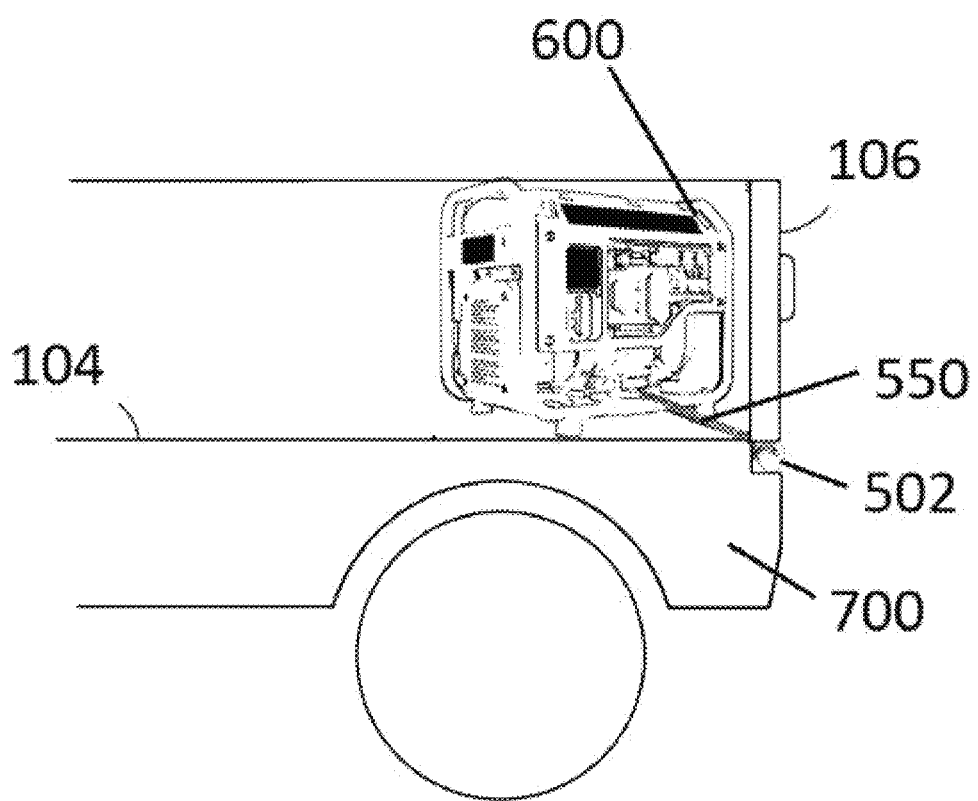
FIG. 37 shows a generator in the storage device.

FIG. 37 shows a generator 600 in storage device 102 using holding weights 502 to secure the generator 600 in the bed of the vehicle 700 using the tailgate 106. The securing weights. The securing cable 550 has a length long enough to secure the storage device 102 or item being secured with the holding weights 550 hanging on beyond the tailgate 106 as shown in FIG. 37.

Figure 38:
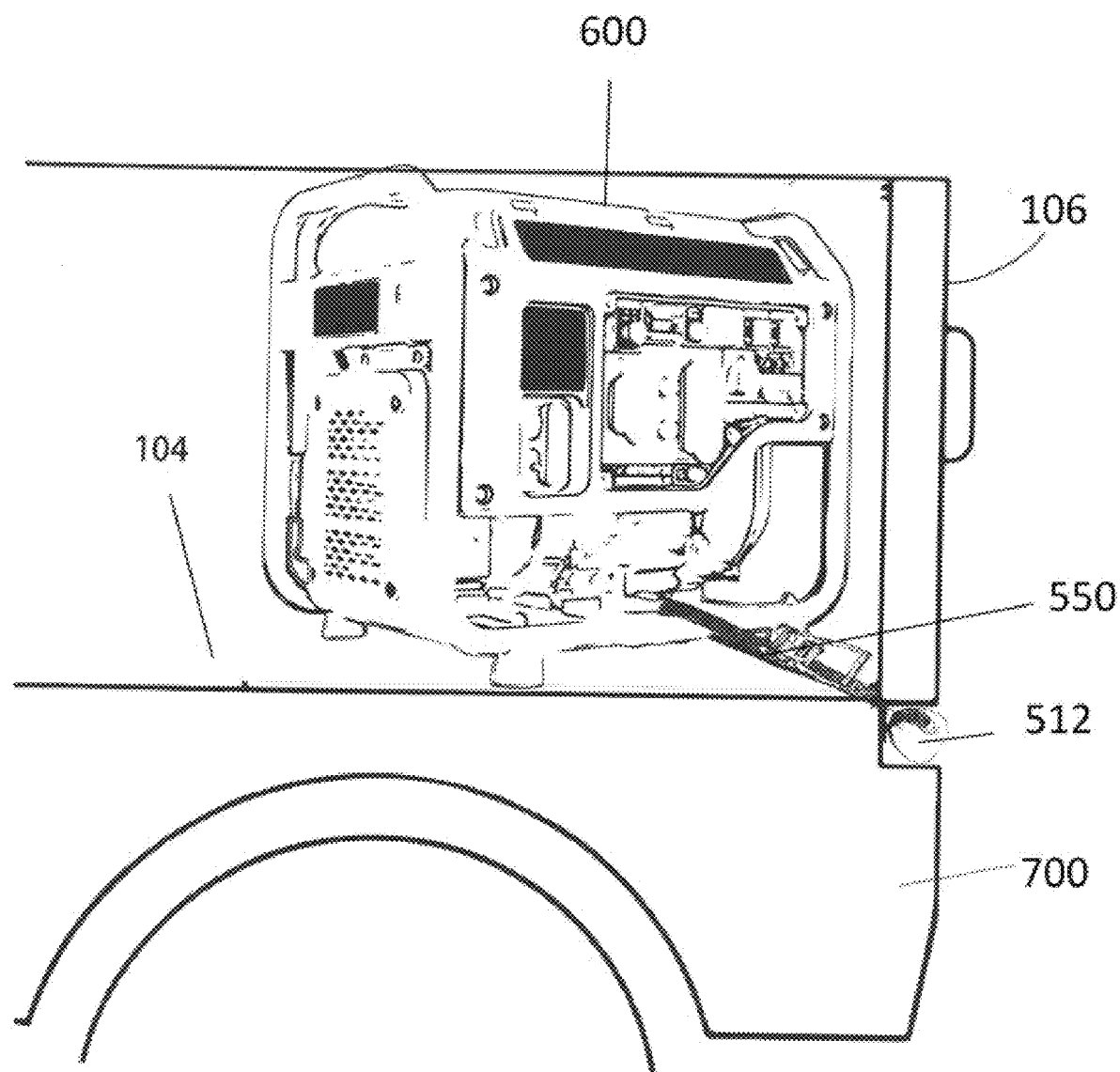
FIG. 38 shows another embodiment of a generator in the storage device.
Figure 39:
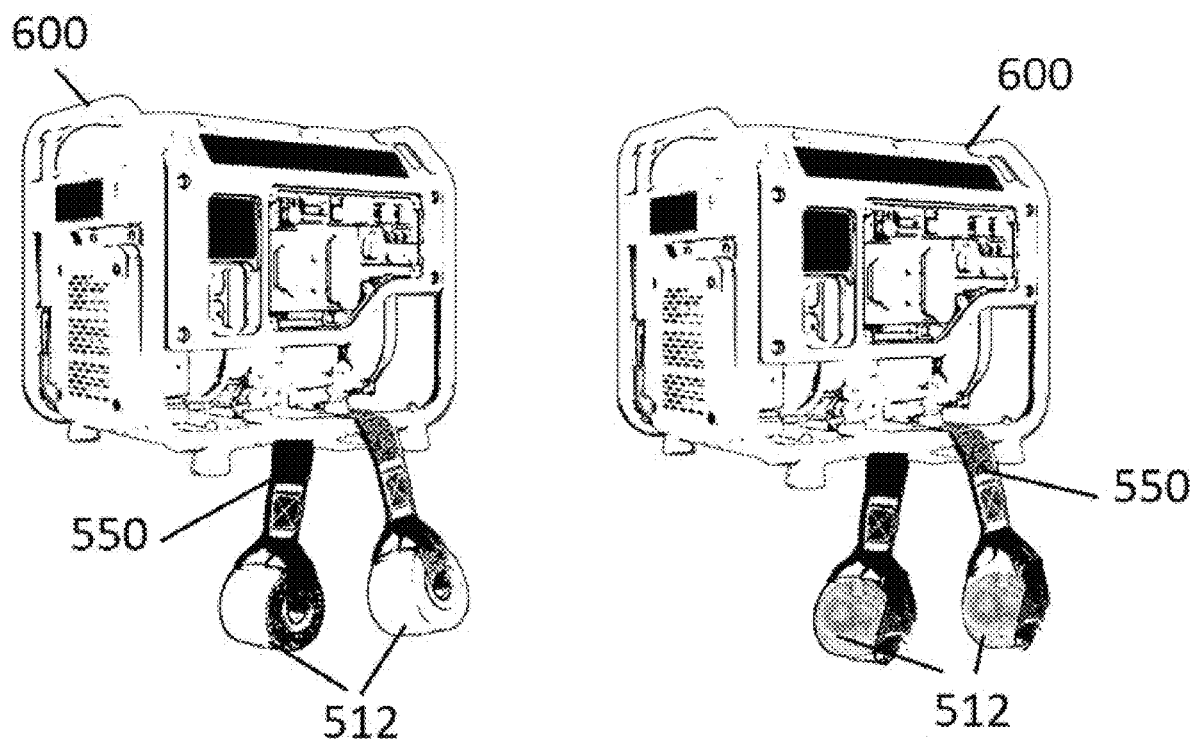
FIG. 39 shows two securing bands embodiments used with a generator.

FIG. 38 shows another embodiment of a generator 600 being stored in the bed 104 of the vehicle. FIG. 39 shows two securing bands embodiments used with a generator 600 where each end of the securing tab is attached to a holding weight 502 with the securing bands 450 wrapping around the item like a generator 600 so it can be secured by the securing bands 450, which are adjustable, going under the tailgate 106 being secured in the bed 104 by the closed tailgate 106 as shown in FIGS. 37 and 38.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art.

What is claimed is:

1. A truck storage device, comprising:
a bottom panel comprising four edges forming a rectangle, the bottom panel movably coupled to a back panel along a first edge of the bottom panel, and
an attachment mechanism along a second edge of the bottom panel opposite from the first edge; and
a top panel movably coupled to the back panel;
having a first side panel and a second side panel where the first side panel and the second side panel are each coupled to one of the bottom panel, the top panel, or the back panel
wherein the bottom panel, the back panel, and the top panel are convertible between a storage configuration and a folded configuration, where in the folded configuration the top panel is lifted up, the first side panel and second side panel are folded toward the back panel, the top panel is folded down toward the back panel, where the first side panel and the second side panel are sandwiched between the top panel and the back panel and the top panel is folded down onto the bottom panel.

2. The truck storage device of claim 1, wherein the bottom panel includes two bottom panel sections movably coupled to each other.

3. The truck storage device of claim 1, wherein the top panel includes two top panel sections movably coupled to each other.

4. The truck storage device of claim 1, wherein the back panel includes two back panel sections movably coupled to each other.

5. The truck storage device of claim 1, further comprising a front panel movably coupled to the top panel.

6. The truck storage device of claim 1 where the front panel has a coupling section that extends transverse to the rest of the front panel hinging the front panel upward onto the top panel.

7. A truck storage device, comprising:
a bottom panel having four edges forming a rectangle, the bottom panel movably coupled to a back panel along a first edge of the bottom panel, and an attachment mechanism along a second edge of the bottom panel opposite from the first edge; and
a top panel movably coupled to the back panel;
wherein the bottom panel, the back panel, and the top panel are convertible between a storage configuration and a folded configuration, where in the folded configuration the top panel is lifted up, the first side panel and second side panel are folded toward the back panel, the top panel is folded down toward the back panel, where the first side panel and the second side panel are sandwiched between the top panel and the back panel and the top panel is folded down onto the bottom panel, wherein the attachment mechanism secures the storage device to the vehicle.

8. The truck storage device of claim 7, wherein the attachment mechanism is a plurality of rods connected to the storage device by a securing band where the securing band goes under a tailgate.

9. The truck storage device of claim 8, wherein a mesh is used to cover the rods.

10. The truck storage device of claim 7, wherein a plurality of holding weights are connected to the storage device to secure it to the vehicle.

11. The truck storage device of claim 10, wherein a plurality of holding weights are connected to the storage device to secure it to the vehicle using a plurality of securing cables.

12. The truck storage device of claim 7, wherein the attachment mechanism is a plurality of holding weights each connected to the storage device by a respective securing cable where the securing cables go under a tailgate and are attached to the bottom panel.

13. The truck storage device of claim 7 where the front panel has a coupling section that extends transverse to the rest of the front panel hinging the front panel upward onto the top panel.

* * * * *